US007567900B2

(12) United States Patent
Suzuki et al.

(10) Patent No.: US 7,567,900 B2
(45) Date of Patent: Jul. 28, 2009

(54) HARMONIC STRUCTURE BASED ACOUSTIC SPEECH INTERVAL DETECTION METHOD AND DEVICE

(75) Inventors: Tetsu Suzuki, Neyagawa (JP); Takeo Kanamori, Hirakata (JP); Takashi Kawamura, Settu (JP)

(73) Assignee: Panasonic Corporation, Osaka (JP)

( * ) Notice: Subject to any disclaimer, the term of this patent is extended or adjusted under 35 U.S.C. 154(b) by 753 days.

(21) Appl. No.: 10/542,931

(22) PCT Filed: Jun. 3, 2004

(86) PCT No.: PCT/JP2004/008051

§ 371 (c)(1),
(2), (4) Date: Jul. 21, 2005

(87) PCT Pub. No.: WO2004/111996

PCT Pub. Date: Dec. 23, 2004

(65) Prior Publication Data

US 2006/0053003 A1 Mar. 9, 2006

(30) Foreign Application Priority Data

Jun. 11, 2003 (JP) ............................ 2003-165946

(51) Int. Cl.
*G10L 15/20* (2006.01)
*G10L 11/06* (2006.01)
*G10L 15/00* (2006.01)
*G10L 17/00* (2006.01)

(52) U.S. Cl. ....................... 704/233; 704/248; 704/231; 704/208

(58) Field of Classification Search ................. 704/231, 704/233, 208, 248
See application file for complete search history.

(56) References Cited

U.S. PATENT DOCUMENTS 4,277,644 A * 7/1981 Levinson et al. ............ 704/241
4,538,234 A * 8/1985 Honda et al. ................ 704/229
4,628,529 A * 12/1986 Borth et al. ................ 381/94.3
5,471,558 A * 11/1995 Tsutsui ....................... 704/219
5,818,928 A * 10/1998 Rozinaj et al. ......... 379/406.07
6,058,359 A * 5/2000 Hagen et al. ................ 704/214
6,272,460 B1 * 8/2001 Wu et al. .................... 704/226
6,775,629 B2 * 8/2004 Rao et al. ..................... 702/76

(Continued)

FOREIGN PATENT DOCUMENTS

JP 60-114900 6/1985

(Continued)

*Primary Examiner*—Talivaldis I Smits
*Assistant Examiner*—Douglas C Godbold
(74) *Attorney, Agent, or Firm*—Wenderoth, Lind & Ponack, L.L.P.

(57) ABSTRACT

A harmonic structure acoustic signal detection device not depending on the level fluctuation of the input signal including: an FFT unit which performs FFT on an input signal and calculates a power spectrum component for each frame; a harmonic structure extraction unit which leaves only a harmonic structure from the power spectrum component; a voiced feature evaluation unit which evaluates correlation between the frames of harmonic structures extracted by the harmonic structure extraction unit, thereby evaluates whether or not the segment is a vowel segment, and extracts the voiced segment; and a speech segment determination unit which determines a speech segment according to the continuity and durability of the output of the voiced feature evaluation unit.

16 Claims, 32 Drawing Sheets

U.S. PATENT DOCUMENTS

2003/0171916 A1 * 9/2003 Kamba ........................ 704/205

FOREIGN PATENT DOCUMENTS

| | | |
|---|---|---|
| JP | 9-153769 | 6/1997 |
| JP | 11-143460 | 5/1999 |
| JP | 2000-66691 | 3/2000 |
| JP | 2000-81900 | 3/2000 |
| JP | 2001-142480 | 5/2001 |
| JP | 2001-222289 | 8/2001 |
| JP | 2001-236085 | 8/2001 |
| JP | 2002-162982 | 6/2002 |

* cited by examiner

Speech: Vacuum cleaner noise of 10dB
(a) Power spectra P(i)
(b) Harmonic structure values R(i)
(c) Weighted distributions Ve(i)
(d) Speech segments (before concatenation) based on weighted distributions Ve(i)
(e) Speech segments (after concatenation) based on weighted distributions Ve(i)
80
60
40
5
0
-5
4
2
0
1
0.5
0
50
100
150
200
250
300
350
400

HARMONIC STRUCTURE BASED ACOUSTIC SPEECH INTERVAL DETECTION METHOD AND DEVICE

TECHNICAL FIELD

The present invention relates to a harmonic structure signal and harmonic structure acoustic signal detection method of detecting, a signal having a harmonic structure, in an input acoustic signal, and a start and end point of a segment including speech, in particular, as a speech segment, and particularly to a harmonic structure signal and harmonic structure acoustic signal detection method to be used in situations with environmental noise.

BACKGROUND ART

The human voice is produced by the vibration of vocal folds and the resonance of phonatory organs. It is known that a human being produces various sounds in order to change the loudness and pitch of his voice by controlling his vocal folds to change the frequency of their vibration or by changing the positions of his phonatory organs such as a nose and a tongue, namely by changing the shape of his vocal tract. It is also known that, when considering the sound of a voice as an acoustic signal, the feature of such an acoustic signal is that it contains spectral envelope components which change gradually according to the frequencies and spectral fine structure components which change periodically in a short time (for the case of voiced vowels and the like) or which change aperiodically (for the case of consonants and unvoiced vowels). The former spectral envelope components represent the resonance features of the phonatory organs, and used as features indicating the shapes of a human throat and mouth, for example, as features for speech recognition. On the other hand, the latter spectral fine structure components represent the periodicity of the sound source, and used as features indicating the fundamental periods of vocal folds, namely the voice pitches. The spectrum of a speech signal is expressed by the product of these two elements. A signal which contains the latter component which clearly indicates the fundamental period and the harmonic component thereof, particularly in a vowel part or the like, is also called a harmonic structure.

Conventionally, various methods for detecting a speech segment in an input acoustic signal have been suggested. They are roughly classified into the following: a method for identifying a speech segment using amplitude information, such as frequency band power and spectral envelope, indicating the rough shape of the spectrum of an input acoustic signal (hereinafter referred to as "method 1"); a method for detecting the opening and closing of a mouth in a video by analyzing it ("method 2"); a method for detecting a speech segment by comparing an acoustic model which represents speech and noise with the feature of an input acoustic signal ("method 3"); and a method for determining a speech segment by focusing attention on a speech spectral envelope shape determined by the shape of a vocal tract and a harmonic structure which is created by the vibration of vocal folds, which are both the features of articulatory organs ("method 4").

However, method 1 has an inherent problem that it is difficult to distinguish between speech and noise, based on amplitude information only. So, in method 1, a speech segment and a noise segment are assumed and the speech segment is detected by relearning a threshold value determined in order to distinguish between the speech segment and the noise segment. Therefore, when the amplitude of the noise segment against the amplitude of the speech segment (namely, the speech signal-to-noise ratio (hereinafter referred to as "SNR")) becomes large during the process of learning, the accuracy of the assumption itself of the noise segment and the speech segment has an influence on the performance, which reduces the accuracy of the threshold learning. As a result, there occurs a problem that the performance of speech segment detection is degraded.

In method 2, it is possible to maintain the detection/estimation accuracy of a speech segment constant regardless of the SNR if the opening of a mouth during the speech segment is detected, for example, not using sound input but only using an image. However, there are problems that the image processing costs more than the speech signal processing, and a speech segment cannot be detected if a mouth does not face toward a camera.

In method 3, it is difficult to assume noise in itself while the performance under the assumed environmental noise is ensured, so this method is available in the limited environment only. Although this method suggests a technique to learn the noise environment on the site, such technique has a problem that the performance is degraded depending on the accuracy of the learning method, as is the case with the method using amplitude information (i.e., method 1).

On the other hand, the method 4 has been suggested, in which a speech segment is detected by focusing attention on the spectral envelope shape determined by the vocal tract shape as well as the harmonic structure created by the vibration of vocal folds, which are the features of articulatory organs.

The method using the spectral envelope shape includes a method for evaluating the continuity of band power, for example, cepstra. In this method, the performance is degraded because it is hard to distinguish noise offset components under the lowered SNR situation.

A pitch detection method is one of the methods focusing attention on the harmonic structure, and various other methods have been suggested, such as a method for extracting an auto-correlation and a higher frequency part in the time domain and a method for creating an auto-correlation in the frequency domain. However, these methods have problems; for example, it is difficult to extract a speech segment if a current signal does not have a single pitch (harmonic fundamental frequency), and an extraction error is likely to occur due to environmental noise.

Additionally, there is a well-known technique of accentuating, suppressing, or separating and extracting an acoustic signal having a harmonic structure such as a human voice and a specific musical instrument, from an acoustic signal consisting of a mixture of several kinds of acoustic signals. For example, the following methods have been suggested: for speech signals, a noise reduction device which reduces only noise in an acoustic signal consisting of a mixture of noise signals and speech signals (See, for example, Japanese Laid-Open Patent Application No. 09-153769 Publication); and for music signals, a method for separating and removing a melody included in played music signal (See, for example, Japanese Laid-Open Patent Application No. 11-143460 Publication).

However, according to the method described in Japanese Laid-Open Patent Application No. 09-153769 Publication, speech and non-speech are detected by observing a linear predictive residual signal in each frequency band of an input signal. Therefore, this method has a problem that the performance is degraded under the non-stationary noise condition with the lower SNR in which the linear prediction does not work well.

The method described in Japanese Laid-Open Patent Application No. 11-143460 Publication is a method using the feature specific to melodies in music that a sound of the same pitch continues for a predetermined period of time. Therefore, there is a problem that it is as difficult to use this method as it is to separate speech from noise. In addition, the large amount of processing required for this method becomes a problem if one does not want to separate or remove acoustic components.

A method using the acoustic feature itself which represents a harmonic structure as an evaluation function has also been suggested (See, for example, Japanese Laid-Open Patent Application No. 2001-222289 Publication). FIG. 32 is a block diagram showing an outline structure of a speech segment determination device which uses the method suggested in Japanese Laid-Open Patent Application No. 2001-222289 Publication.

A speech segment detection device shown in FIG. 32 is a device which determines a speech segment in an input signal, and includes a fast Fourier transform (FFT) unit 100, a harmonic structure evaluation unit 101, a harmonic structure peak detection unit 102, a pitch candidate detection unit 103, an inter-frame amplitude difference harmonic structure evaluation unit 104 and a speech segment determination unit 105.

The FFT unit 100 performs FFT processing on an input signal for each frame (for example, one frame is 10 msec) so as to perform frequency transform on the input signal, and carries out various analyses thereof. The harmonic structure evaluation unit 101 evaluates whether or not each frame has a harmonic structure based on the frequency analysis result obtained from the FFT unit 100. The harmonic structure peak detection unit 102 converts the harmonic structure extracted by the harmonic structure evaluation unit 101 into the local peak shape, and detects the local peak.

The pitch candidate detection unit 103 detects a pitch by tracking the local peaks detected by the harmonic structure peak detection unit 102 in the time axis direction (frame direction). A pitch denotes the fundamental frequency of a harmonic structure.

The inter-frame amplitude difference harmonic structure evaluation unit 104 calculates the value of the inter-frame difference of the amplitudes obtained as a result of the frequency analysis by the FFT unit 100, and evaluates whether or not the current frame has a harmonic structure based on the difference value.

The speech segment determination unit 105 makes a comprehensive determination of the pitch detected by the pitch candidate detection unit 103 and the evaluation result by the inter-frame amplitude difference harmonic structure evaluation unit 104 so as to determine the speech segment.

According to the speech segment detection device 10 shown in FIG. 32, it becomes possible to determine a speech segment not only in an acoustic signal having a single pitch but also in an acoustic signal having a plurality of pitches.

However, when the pitch candidate detection unit 103 tracks local peaks, appearance and disappearance of such local peaks have to be considered, and it is difficult to detect the pitch with high accuracy considering such appearance and disappearance.

In view of the fact that a peak which is a local maximum value is handled, great resistance to noise cannot be expected. In addition, the inter-frame amplitude difference harmonic structure evaluation unit 104 evaluates whether or not the difference between frames has a harmonic structure in order to evaluate temporal fluctuations. However, since it just uses the difference of amplitudes, there is the problem that not only is the information of the harmonic structure lost, but also an acoustic feature itself of a sudden noise is evaluated as a difference value if such a sudden noise occurs.

Against this backdrop, the present invention has been conceived in order to solve the above-mentioned problems, and it is an object of the present invention to provide a harmonic structure acoustic signal detection method and device which allow highly accurate detection of a speech segment, not depending on the level fluctuations of an input signal.

It is another object thereof to provide a harmonic structure acoustic signal detection method and device with outstanding real-time features.

BRIEF SUMMARY OF THE INVENTION

A harmonic structure acoustic signal detection method in an aspect of the present invention is a method of detecting, from an input acoustic signal, a segment that includes a signal having a harmonic structure, particularly speech, as a speech segment, the method including: an acoustic feature extraction step of extracting an acoustic feature of each frame into which the input acoustic signal is divided at every predetermined time period; and a segment determination step of evaluating continuity of the acoustic features and of determining a speech segment according to the evaluated continuity.

As described above, a speech segment is determined by evaluating the continuity of acoustic features. Unlike the conventional method of tracking local peaks, there is no need to consider the fluctuations of the input acoustic signal level resulting from appearance and disappearance of local peaks, therefore a speech segment can be determined with accuracy.

It is preferable that the frequency transform is performed on each frame of the input acoustic signal in the acoustic feature extraction step, and a harmonic structure is accentuated based on each component obtained through the frequency transform and the acoustic feature is extracted.

A harmonic structure is seen in speech (particularly in a vowel sound). Therefore, by determining a speech segment using the acoustic feature in which the harmonic structure is accentuated, the speech segment can be determined with higher accuracy.

It is also preferable that in the acoustic feature extraction step, a harmonic structure is extracted from each component obtained through the frequency transform, and an acoustic feature is obtained through a component that consists of a predetermined frequency band that includes the extracted harmonic structure.

By determining a speech segment using the acoustic feature of the frame including only the frequency bands in which harmonic structures are clearly maintained, the speech segment can be determined with higher accuracy.

It is also preferable that in the segment determination step, continuity of the acoustic features is evaluated based on a correlation value between the acoustic features of the frames.

As described above, the continuity of harmonic structures is evaluated based on the correlation value between the acoustic features of the frames. Therefore, compared with the conventional method of evaluating the continuity of harmonic structures based on the amplitude difference between frames, better evaluation can be made using more information of the harmonic structures. As a result, even in the case where a sudden noise over a short period of frames occurs, such a sudden noise is not detected as a speech segment, and thus a speech segment can be detected with accuracy.

It is also preferable that the segment determination step includes: an evaluation step of calculating an evaluation value for evaluating the continuity of the acoustic features; and a speech segment determination step of evaluating temporal continuity of the evaluation values and of determining a speech segment according to the evaluated temporal continuity.

As described in the embodiments, the processing in the speech segment determination step corresponds to the processing for concatenating temporally adjoining voiced segments (voiced segments obtained based only on the evaluation values) so as to detect a speech segment precisely. The speech segment determined through concatenating the temporally adjoining voiced segments may lead to inclusion of a consonant portion that has a smaller evaluation value for harmonic structure than that within a vowel portion.

It is further possible to figure out whether a segment having a harmonic structure is speech or non-speech, like music, by evaluating the segment in detail. As for the frames judged to have a harmonic structure, by evaluating the continuity of number indices of the frequency bands, in which the maximum or minimum value for harmonic structure is detected, it is possible to assess if the segment is speech or music.

As for a segment which is determined to have a harmonic structure using the continuity of the evaluation values for the harmonic structures, it is possible to judge, using its distribution of the evaluation values, whether such a segment is a transmutation from the speech or music segments having continuous harmonic structures, or a sudden noise having a harmonic structure.

As for segments other than the segments having the above-mentioned of harmonic structures, it is possible to judge them to be segments regarded as silence because an input signal is weak or non-harmonic structure segments having no harmonic structure.

As shown in the fifth embodiment, the present invention discloses a method for determining if each frame has a harmonic structure while receiving a sound signal.

It is also preferable that the segment determination step further includes: a step of estimating a speech signal-to-noise ratio of the input acoustic signal based on comparisons, for a predetermined number of frames, between (i) acoustic features extracted in the acoustic feature extraction step or the evaluation values calculated in the evaluation step and (ii) a first predetermined threshold; and a step of determining the speech segment based on the evaluation value calculated in the evaluation step, in the case where the estimated speech signal-to-noise ratio is equal to or higher than a second predetermined threshold, and in the speech segment determination step, the temporal continuity of the evaluation values is evaluated and the speech segment is determined according to the evaluated temporal continuity, in the case where the speech signal-to-noise ratio is lower than the second predetermined threshold.

Accordingly, in the case where the estimated speech signal-to-noise ratio of an input acoustic signal is high, it is possible to omit evaluating the temporal continuity of the evaluation values for evaluating the continuity of acoustic features for determining the speech segment. Therefore, the speech segment can be detected with outstanding real-time features.

Note that the present invention can be embodied not only as the above-mentioned harmonic structure acoustic signal segment detection method but also as a harmonic structure acoustic signal segment detection device including, as units, the steps included in that method, and as a program causing a computer to execute each of the steps of the harmonic structure acoustic signal detection method. The program can be distributed via a storage medium such as CD-ROM and a transmission medium such as the Internet.

As described above, according to the harmonic structure acoustic signal detection method and device, it becomes possible to separate speech segments from noise segments accurately. It is possible to improve the speech recognition level particularly by applying the present invention as a pre-process for a speech recognition method, and therefore the practical value of the present invention is extremely high. It is also possible to efficiently use memory capacity, such as recording of only speech segments, by applying the present invention to an integrated circuit (IC) recorder, or the like.

BRIEF DESCRIPTION OF DRAWINGS

FIG. 13 (*b*) is a diagram showing harmonic structure values R(i). FIG. 13 (*c*) is a diagram showing band numbers N(i). FIG. 13 (*d*) is a diagram showing weighted band numbers Ne(i). FIG. 13 (*e*) is a diagram showing corrected harmonic structure values R'(i).

FIG. 14 (*b*) is a diagram showing harmonic structure values R(i). FIG. 14 (*c*) is a diagram showing band numbers N(i). FIG. 14 (*d*) is a diagram showing weighted band numbers Ne(i). FIG. 14 (*e*) is a diagram showing corrected harmonic structure values R'(i).

FIG. 15 (*b*) is a diagram showing harmonic structure values R(i). FIG. 15 (*c*) is a diagram showing band numbers N(i). FIG. 15 (*d*) is a diagram showing weighted band numbers Ne(i). FIG. 15 (*e*) is a diagram showing corrected harmonic structure values R'(i).

FIG. 16 (*b*) is a diagram showing harmonic structure values R(i). FIG. 16 (*c*) is a diagram showing band numbers N(i). FIG. 16 (*d*) is a diagram showing weighted band numbers Ne(i). FIG. 16 (*e*) is a diagram showing corrected harmonic structure values R'(i).

FIG. 22 (*b*) is a diagram showing harmonic structure values R(i). FIG. 22 (*c*) is a diagram showing weighted distributions Ve(i). FIG. 22 (*d*) is a diagram showing speech segments before being concatenated. FIG. 22 (*e*) is a diagram showing speech segments after being concatenated.

FIG. 23 (*b*) is a diagram showing harmonic structure values R(i). FIG. 23 (*c*) is a diagram showing weighted distributions Ve(i). FIG. 23 (*d*) is a diagram showing speech segments before being concatenated. FIG. 23 (*e*) is a diagram showing speech segments after being concatenated.

FIG. 25 (*b*) is a diagram showing power spectra of the input signal. FIG. 25 (*c*) is a diagram showing harmonic structure values R(i). FIG. 25 (*d*) is a diagram showing weighted harmonic structure values Re(i). FIG. 25 (*e*) is a diagram showing corrected harmonic structure values R'(i).

FIG. 26 (*b*) is a diagram showing power spectra of the input signal. FIG. 26 (*c*) is a diagram showing harmonic structure values R(i). FIG. 26 (*d*) is a diagram showing weighted harmonic structure values Re(i). FIG. 26 (*e*) is a diagram showing corrected harmonic structure values R'(i).

DETAILED DESCRIPTION OF THE INVENTION

First Embodiment

Figure 1:
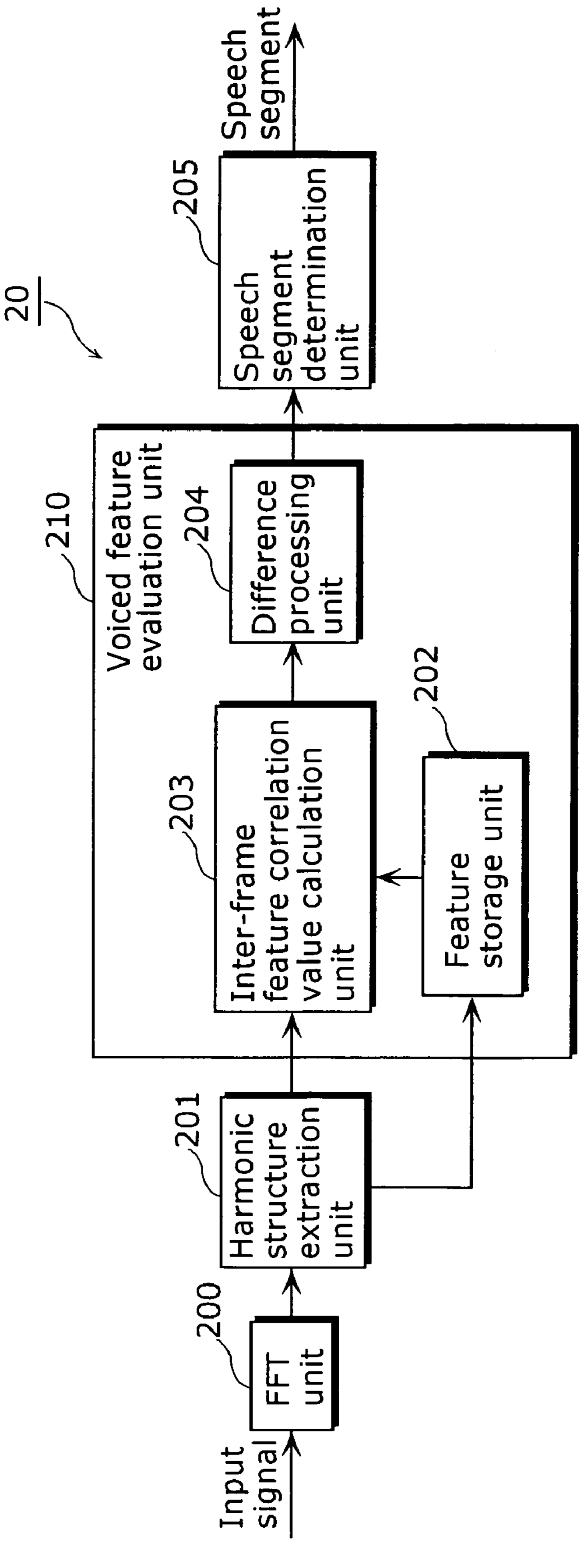
FIG. 1 is a block diagram showing a hardware structure of a speech segment detection device according to a first embodiment of the present invention.

A description is given below, with reference to the drawings, of a speech segment detection device according to the first embodiment of the present invention. FIG. 1 is a block diagram showing a hardware structure of a speech segment detection device 20 according to the first embodiment.

The speech segment detection device 20 is a device which determines, in an input acoustic signal (hereinafter referred to just as an "input signal"), a speech segment that is a segment during which a man is vocalizing (uttering speech sounds). The speech segment detection device 20 includes an FFT unit 200, a harmonic structure extraction unit 201, a voiced feature evaluation unit 210, and a speech segment determination unit 205.

The FFT unit 200 performs FFT on the input signal so as to obtain power spectral components of each frame. The time of each frame shall be 10 msec here, but the present invention is not limited to this time.

The harmonic structure extraction unit 201 removes noise components and the like from the power spectral components extracted by the FFT unit 200, and extracts power spectral components having only the harmonic structures.

The voiced feature evaluation unit 210 is a device which evaluates the inter-frame correlation of the power spectral components having only the harmonic structures extracted by the harmonic structure extraction unit 201 so as to evaluate whether each frame is a vowel segment or not and extract a voiced segment. The voiced feature evaluation unit 210 includes a feature storage unit 202, an inter-frame feature correlation value calculation unit 203 and a difference processing unit 204. Note that harmonic structure is a property which is often seen in the power spectral distribution in a vowel phonation segment. No such harmonic structures as seen in the power spectral distribution of a vowel phonation segment are seen in the power spectral distribution in a consonant phonation segment.

The feature storage unit 202 stores the power spectra of a predetermined number of frames outputted from the harmonic structure extraction unit 201. The inter-frame feature correlation value calculation unit 203 calculates the correlation value between the power spectrum outputted from the harmonic structure extraction unit 201 and the power spectrum of a frame which precedes the current frame by a predetermined number of frames and is stored in the feature storage unit 202. The difference processing unit 204 calculates the average value of the correlation values calculated by the inter-frame feature correlation value calculation unit 203 for a predetermined period of time, subtracts the average value from the respective correlation values outputted from the inter-frame feature correlation value calculation unit 203, and obtains the corrected correlation values based on the average of the differences between the correlation values and the average value.

The speech segment determination unit 205 determines the speech segment based on the corrected correlation value obtained from the average difference outputted from the difference processing unit 204.

Figure 2:
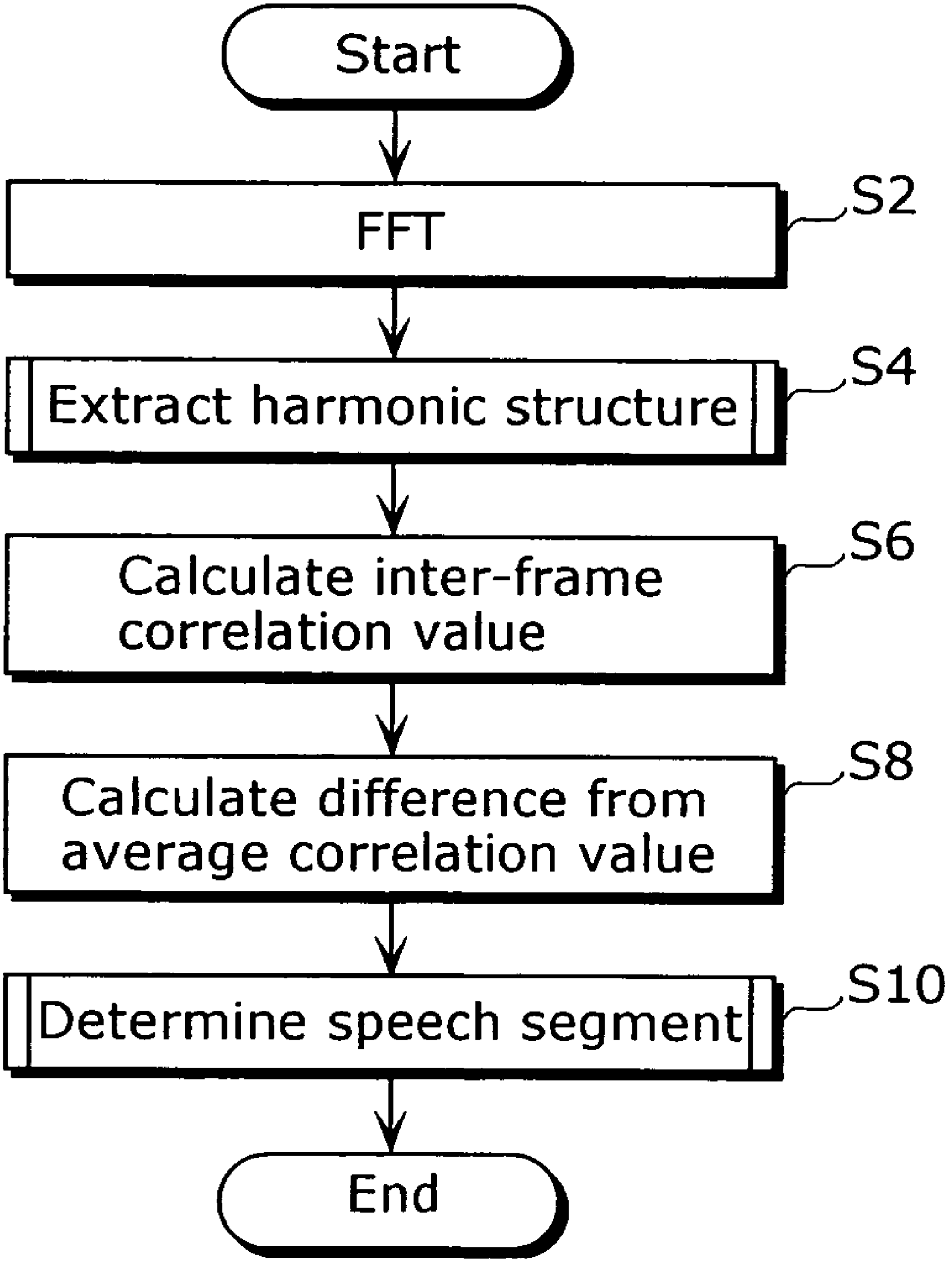
FIG. 2 is a flowchart of processing performed by the speech segment detection device according to the first embodiment.

A description is given below of the operation of the speech segment detection device 20 structured as above. FIG. 2 is a flowchart of the processing performed by the speech segment detection device 20.

The FFT unit 200 performs an FFT on an input signal so as to obtain the power spectral components thereof as the acoustic features used for extracting the harmonic structures (S2). More specifically, the FFT unit 200 performs sampling on the input signal at a predetermined sampling frequency Fs (for example, 11.025 kHz) to obtain FFT spectral components at a predetermined number of points (for example, 128 points) per frame (for example, 10 msec). The FFT unit 200 obtains the power spectral components by converting the spectral components obtained at respective points into logarithms. Hereinafter, a power spectral component is referred to just as a spectral component, if necessary.

Next, the harmonic structure extraction unit 201 removes noise components and the like from the power spectral components extracted by the FFT unit 200 so as to extract the power spectral components having only the harmonic structures (S4).

The power spectral components calculated by the FFT unit 200 contain the noise offset and the spectral envelope shapes created by the vocal tract shape, and thus causes time jitter.

Therefore, the harmonic structure extraction unit 201 removes these components and extracts the power spectral components having only the harmonic structures which are produced by vocal fold vibration. As a result, a voiced segment is detected more effectively.

Figure 3:
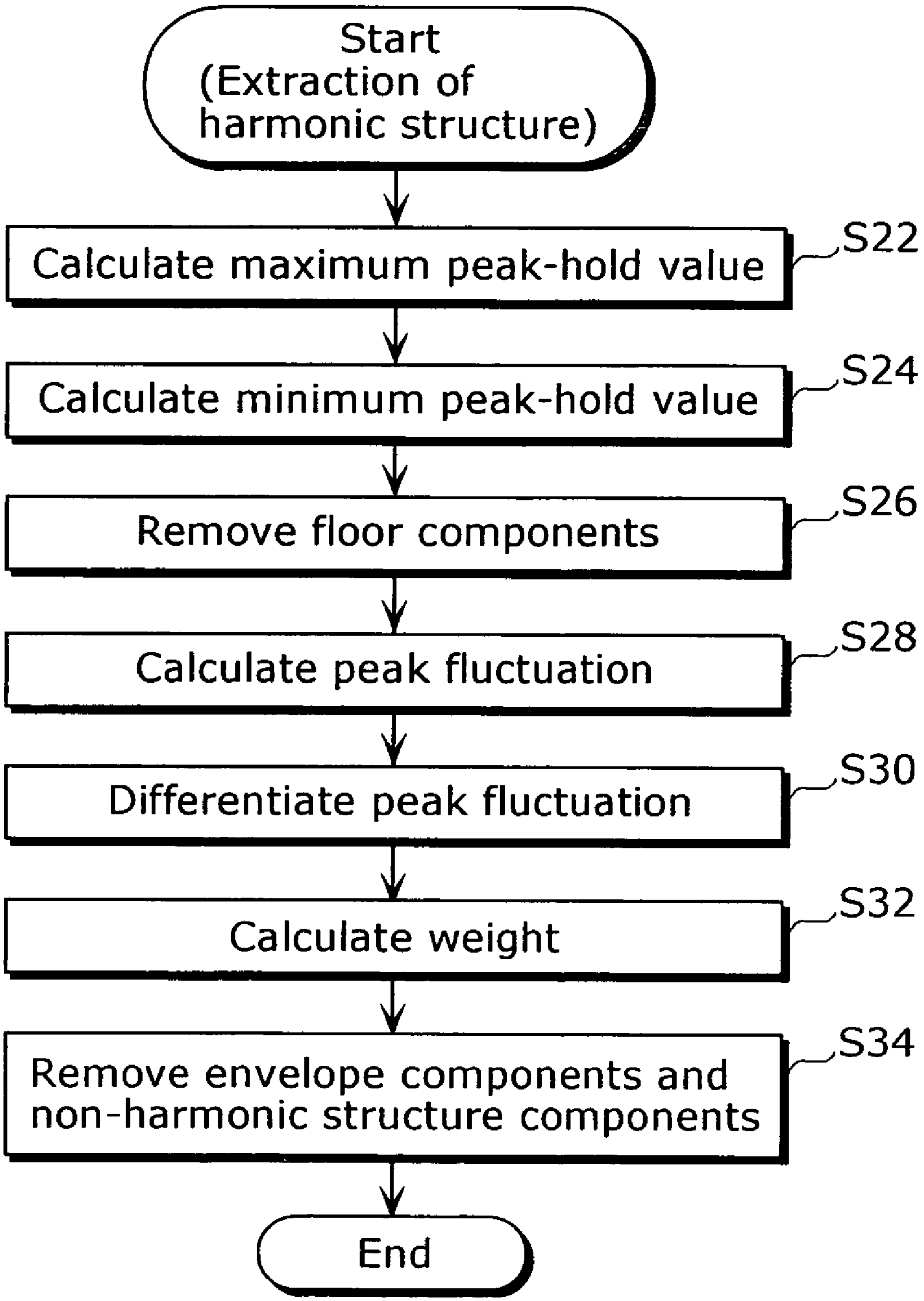
FIG. 3 is a flowchart of harmonic structure extraction processing by a harmonic structure extraction unit.
Figure 4:
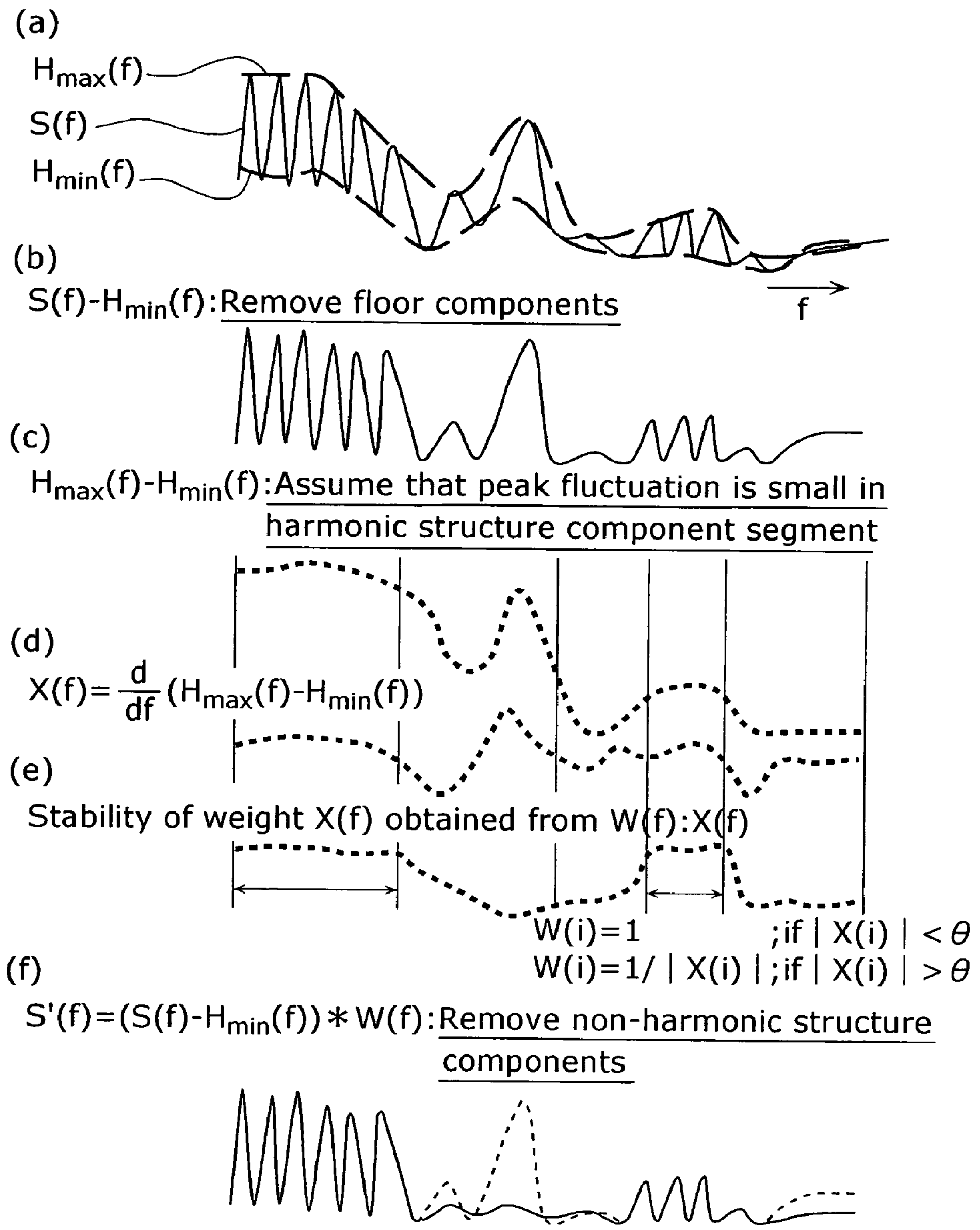
FIG. 4 (*a*) to (*f*) is a diagram schematically showing processes of extracting spectral components which contain only harmonic structures from spectral components of each frame.

A detailed description is given, with reference to FIG. 3 and FIG. 4, of the processing by the harmonic structure extraction unit 201 (S4). FIG. 3 is a flowchart of the harmonic structure extraction processing by the harmonic structure extraction unit 201, and FIG. 4 is a diagram schematically showing the processes of extracting spectral components which have only harmonic structures from spectral components of each frame.

As shown in FIG. 4 (*a*), the harmonic structure extraction unit 201 calculates the maximum peak-hold value Hmax(f) from the spectral components S(f) of each frame (S22), and calculates the minimum peak-hold value Hmin(f) (S24).

As shown in FIG. 4 (*b*), the harmonic structure extraction unit 201 removes the floor components included in the spectral components S(f) by subtracting the minimum peak-hold value Hmin(f) from the respective spectral components S(f) (S26). As a result, fluctuating components resulting from noise offset components and spectral envelope components are removed.

As shown in FIG. 4 (*c*), the harmonic structure extraction unit 201 calculates the difference value between the maximum peak-hold value Hmax(f) and the minimum peak-hold value Hmin(f) so as to calculate the peak fluctuation (S28).

As shown in FIG. 4 (*d*), the harmonic structure extraction unit 201 differentiates the amount of peak fluctuation in the frequency direction so as to calculate the amount of change in the peak fluctuation (S30). This calculation is made for the purpose of detecting the harmonic structures based on the assumption that the change in peak fluctuation is small.

As shown in FIG. 4 (*e*), the harmonic structure extraction unit 201 calculates the weight W(f) which realizes the above assumption (S32). In other words, the harmonic structure extraction unit 201 compares the absolute value of the amount of change in the peak fluctuation with a predetermined threshold value, and determines the weight W(f) to be 1 when the absolute value of the change is smaller than the threshold value $\theta$, while determines the weight W(f) to be the inverse of the absolute value of the change when it is equal to or larger than the threshold value $\theta$. As a result, it becomes possible to assign a lighter weight to the part in which the change in the amount of peak fluctuation is larger, while assigning a heavier weight to the part in which the change is smaller.

As shown in FIG. 4 (*f*), the harmonic structure extraction unit 201 multiplies the spectral components with the floor components being removed (S(f)−Hmin(f)) by the weight W(f) so as to obtain the spectral components S'(f) (S34). This processing allows elimination of non-harmonic structure components in which the change in peak fluctuation is large.

Again, the description of the operation of the speech segment detection device 20 shown in FIG. 2 is given. After the harmonic structure extraction processing (S4 in FIG. 2 and FIG. 3), the inter-frame feature correlation value calculation unit 203 calculates the correlation value between the spectral components outputted from the harmonic structure extraction unit 201 and the spectral components of a frame which precedes the current frame by a predetermined number of frames and is stored in the feature storage unit 202 (S6).

A description is given here of a method for calculating a correlation value E1(*j*) using spectral components of adjacent frames, assuming that the current frame is the jth frame. The correlation value E1(*j*) is calculated according to the following equations (1) to (5). More specifically, power spectral components P(i) and P(i−1) at 128 points of a frame i and a frame i−1 shall be represented by the following equations (1) and (2). The value of a correlation function xcorr(P(i−1), P(j)) of the power spectral components P(i) and P(i−1) shall be represented by the following equation (3). In other words, the value of the correlation function xcorr(P(j−1), P(j)) is the vector quantity consisting of the inner product values of respective points. z1(*i*), namely, the maximum value of the vector elements of xcorr(P(j−1), P(j)), is calculated as shown in the following equation (4). This value may be the correlation value E1(*j*) of the frame j, or for example, the value obtained by adding the maximum values of three frames, as shown in the following equation (5).

$$P(i)=(p1(i), p2(i), \ldots, p128(i)) \tag{1}$$

$$P(i-1)=(p1(i-1), p2(i-1), \ldots, p128(i-1)) \tag{2}$$

$$xcorr(P(i-1),P(i))=(p1(i-1)\times p1(i), p2(i-1)\times p2(i), \ldots, p128(i-1)\times p128(i)) \tag{3}$$

$$z1(i)=\max(xcorr(P(i-1),P(i))) \tag{4}$$

$$E1(j)=\sum_{i=j-2}^{j} z1(i) \tag{5}$$

Figure 5:
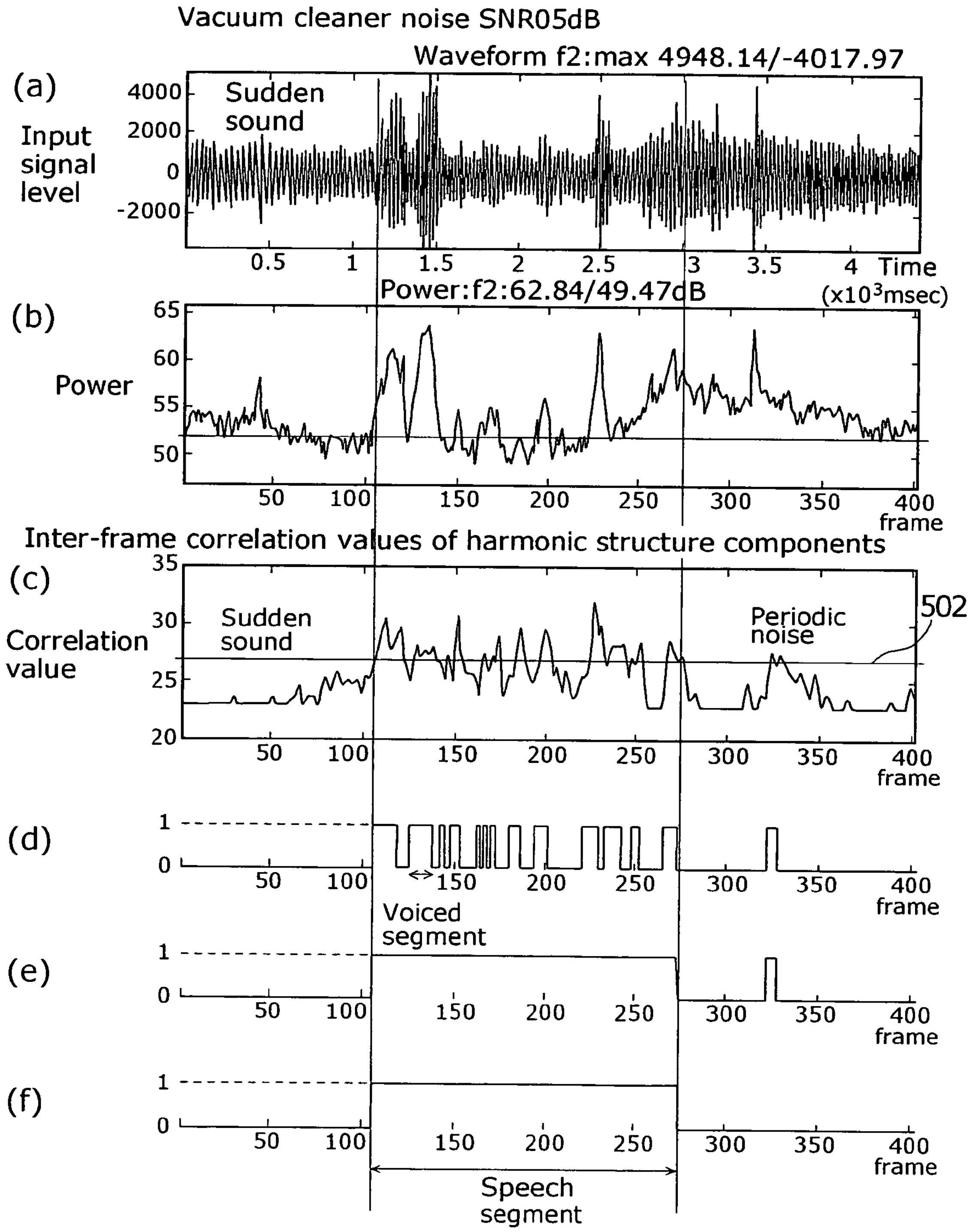
FIG. 5 (*a*) to (*f*) is a diagram showing a transition of an input signal transform according to the present invention.

One example of the correlation value E1(*j*) is described below using graphs shown in FIG. 5. FIG. 5 shows graphs which represent signals obtained by processing an input signal. FIG. 5 (*a*) shows a waveform of the input signal. This waveform is a waveform obtained in the case where a man phonates “aaru ando bii hoteru higashi nihon” during a time period of about 1,200 to 3,000 msec in a vacuum cleaner noise (SNR=0.5 dB) environment. This input signal contains a sudden sound “click” which is made when the vacuum is turned on at the point of about 500 msec, and the sound level of the vacuum increases at the point of about 2,800 msec when the rotation speed of the motor is changed from low to high. FIG. 5 (*b*) shows the power of the input signal after performing FFT on the input signal shown in FIG. 5 (*a*), and FIG. 5 (*c*) shows the transition of the correlation values obtained in the correlation value calculation processing (S6).

Here, the correlation value E1(*j*) is calculated based on the following findings. In other words, the correlation value of acoustic features between frames is obtained based on the fact that the harmonic structures continue in the temporally adjacent frames. Therefore, a voiced segment is detected based on the correlation of the harmonic structures between temporally close frames. Such temporal continuity of harmonic structures is often seen in vowel segments. Therefore, it is deemed that the correlation values are larger in vowel segments, while they are smaller in consonant segments. In other words, it is deemed that when obtaining the correlation values of power spectral components between frames by focusing attention on harmonic structures, such correlation values in aperiodic noise segments become smaller. As a result, voiced segments stand out in the signal and can be identified more easily.

It is said that the duration of a vowel segment is 50 to 150 msec (5 to 15 frames) at the normal speech speed, and it is therefore assumed that the value of a correlation coefficient between frames is large within that duration even if the frames are not adjacent to each other. If this assumption is correct, it is true that this correlation value is an evaluation function which is resistant to aperiodic noise. The correlation value E1(*j*) is calculated using the sum of the values of correlation functions over several frames because the effect of sudden noise has to be removed and there is a finding that a vowel segment has a duration of 50 to 150 msec as mentioned above. Therefore, as shown in FIG. 5 (*c*), there is no reaction to the sudden sound which occurs in the vicinity of the 50th frame and the correlation values remain small.

Next, the difference processing unit 204 calculates the average value of the correlation values for a predetermined time period calculated by the inter-frame feature correlation value calculation unit 203, and subtracts the average value from the correlation value of each frame so as to obtain the correlation value corrected by the average difference (S8). That is because the effect of periodic noise which occurs for a long time can be removed by subtracting the average value from the correlation value. Here, the average value of the correlation values for five seconds or so is calculated, and FIG. 5 (*c*) shows the average value in solid line 502. More specifically, a segment in which the correlation values appear above the solid line 502 is a segment in which the correlation values corrected by the above-mentioned average difference are positive values.

Next, the speech segment determination unit 205 determines the speech segment based on the correlation values corrected from the correlation values E1(*j*) by the difference processing unit 204 using the average difference, according to the following three segment correction methods: selection using correlation values; use of segment duration; and concatenation of segments taking a consonant segments and choked sound segments into consideration (S10).

Figure 6:
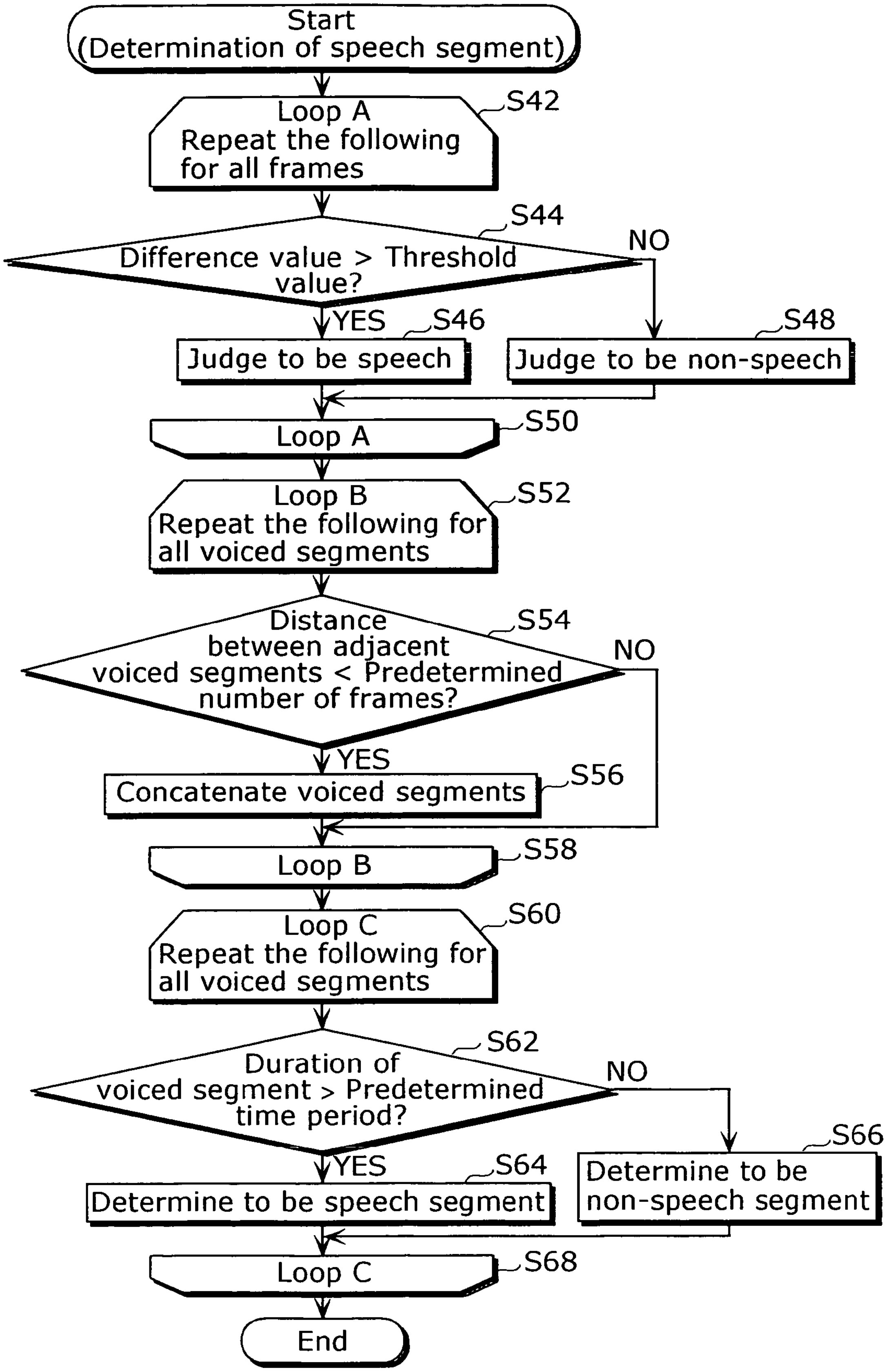
FIG. 6 is a flowchart of speech segment determination processing.

A description is given in more detail of the speech segment determination processing by the speech segment determination unit 205 (S10 in FIG. 2). FIG. 6 is a flowchart showing the details of the speech segment determination processing per voice utterance.

First, judgment of a segment using a correlation value, that is the first segment correction method, is described below. The speech segment determination unit 205 checks, as for a current frame, whether the corrected correlation value calculated by the difference processing unit 204 is larger than a predetermined threshold value or not (S44). For example, in the case where the predetermined threshold value is 0, such checking is equivalent to checking whether the correlation value shown in FIG. 5 (*c*) is larger than the average value of the correlation values (solid line 502).

When the corrected correlation value is larger than the threshold value (YES in S44), it is judged that the current frame is a speech frame (S46), and when the corrected correlation value is equal to or smaller than the predetermined threshold value (NO in S44), it is judged that the current frame is a non-speech frame (S48). The above-mentioned speech judgment processing (S44 to S48) is repeated for all the frames in which speech segments are to be detected (S42 to S50). As a result of the above-mentioned processing, a graph shown in FIG. 5 (*d*) is obtained, and a segment in which speech frames continue is detected as a voiced segment.

As described above, when the corrected correlation value is equal to or smaller than the threshold value, it is judged that the frame is a non-speech frame. However, a corrected correlation value expected in a detected segment varies depending on effects of noise levels and various conditions of acoustic features. Therefore, it is also possible to determine and use a threshold value for distinguishing between a speech frame and a non-speech (noise) frame as appropriate through previous experiments. Using this processing for such stricter selection criterion for a harmonic structure signal, it can be expected to distinguish, as a non-speech frame, a periodic noise having a shorter time period than the time length used for calculation of the average difference, for example, 500 ms or so.

Next, a method for concatenating adjacent voiced segments, namely, the second segment correction method is described below. The speech segment determination unit 205 checks whether a distance (that is the number of frames located) between a current voiced segment and another voiced segment adjacent to the current segment is less than a predetermined number of frames (S54). For example, the predetermined number of frames shall be 30 here. When the distance is less than 30 frames (YES in S54), adjacent two voiced segments are concatenated (S56). The above-mentioned processing (S54 to S56) is performed for all the voiced segments (S52 to S58). As a result of the above-mentioned processing for concatenating voiced segments, a graph shown in FIG. 5 (*e*) is obtained which shows that voiced segments which are close to each other are concatenated.

Voiced segments are concatenated for the following reason. Harmonic structures hardly appear in a consonant segment, particularly in an unvoiced consonant segment such as a plosive (/k/, /c/, /t/ and /p/) and a fricative, so the correlation value of such a segment is small and the segment is hardly detected as a voiced segment. However, since there is a vowel near a consonant, a segment in which vowels continue is regarded as a voiced segment. Therefore, it becomes possible to regard the consonant segment as a voiced segment, too.

Finally, a segment duration that is the third segment correction method is described below. The speech segment determination unit 205 checks whether or not the duration of a current voiced segment is longer than a predetermined time period (S62). For example, the predetermined time period shall be 50 msec. When the duration is longer than 50 msec (YES in S62), it is determined that the current voiced segment is a speech segment (S64), and when the duration is equal to or shorter than 50 msec (NO in S62), it is determined that the current voiced segment is a non-speech segment (S66). By performing the above-mentioned processing (S62 to S66) for all the voiced segments, speech segments are determined (S60 to S68). As a result of the above-mentioned processing, a graph shown in FIG. 5 (*f*) is obtained and a speech segment is detected around the 110th to 280th frames. This diagram shows that a voiced segment corresponding to a periodic noise which exists around 325th frame in the graph of FIG. 5 (*e*) is determined to be a non-speech segment. As described above, in the processing for selecting voiced segments based on their durations, it becomes possible to remove periodic noise having a shorter duration and a higher correlation value.

According to the present embodiment as described above, a voiced segment is determined by evaluating the inter-frame continuity of harmonic structure spectral components. Therefore, it is possible to determine speech segments more accurately than the conventional method for tracking local peaks.

Particularly, the continuity of harmonic structures is evaluated based on the inter-frame correlation values of spectral components. Therefore, it is possible to evaluate such continuity while remaining more information of the harmonic structures than the conventional method for evaluating the continuity of the harmonic structures based on the amplitude difference between frames. Therefore, even in the case where a sudden noise occurs over a short period of frames, such sudden noise is not detected as a voiced segment.

Furthermore, a speech segment is determined by concatenating temporally adjacent voiced segments. Therefore, it is possible to determine not only vowels but also consonants having more indistinct harmonic structures than the vowels to be speech segments. It also becomes possible to remove noise having periodicity by evaluating the duration of a voiced segment.

Second Embodiment

A description is given below, with reference to the drawings, of a speech segment detection device according to the second embodiment of the present invention. The speech segment detection device according to the present embodiment is different from the speech segment detection device according to the first embodiment in that the former determines a speech segment only based on the inter-frame correlation of spectral components in the case of a high SNR.

Figure 7:
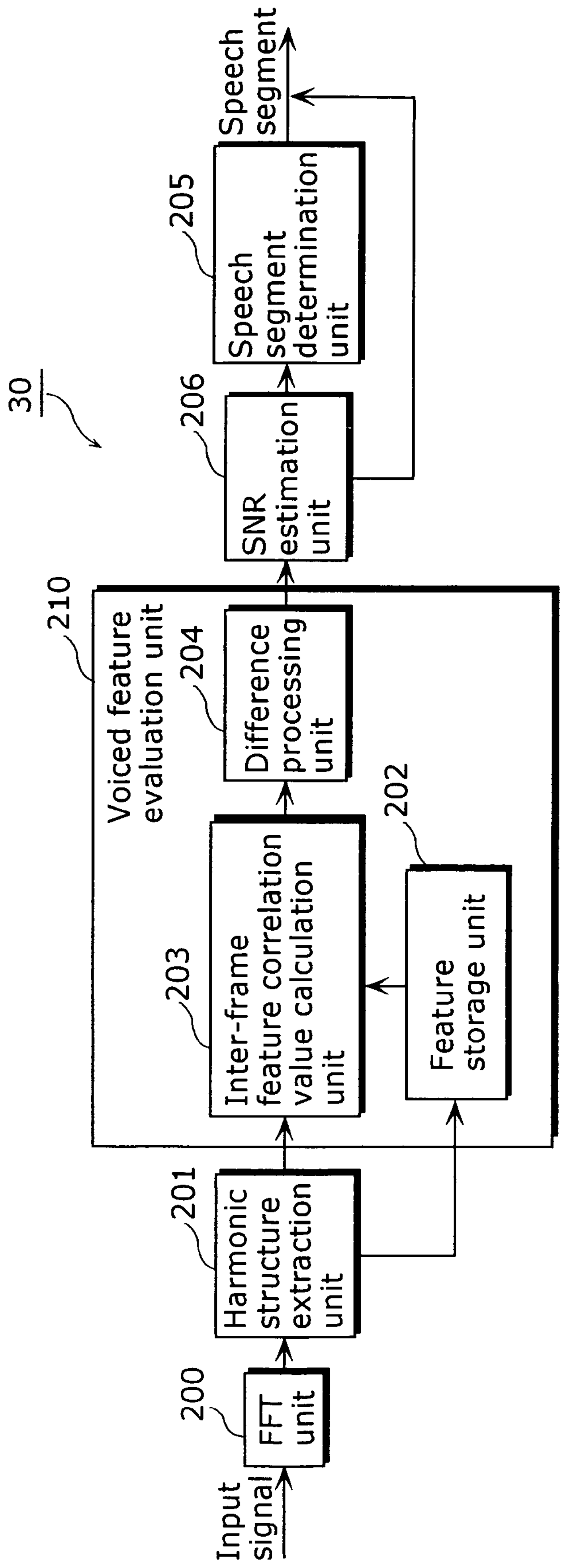
FIG. 7 is a block diagram showing a hardware structure of a speech segment detection device according to a second embodiment of the present invention.

FIG. 7 is a block diagram showing a hardware structure of a speech segment detection device 30 according to the present embodiment. The same reference numbers are assigned to the same constituent elements as those of the speech segment detection device 20 in the first embodiment. Since their names and functions are also same, the description thereof is omitted as appropriate in the following embodiments.

The speech segment detection device 30 is a device which determines, in an input signal, a speech segment that is a segment during which a man utters a sound, and includes the FFT unit 200, the harmonic structure extraction unit 201, a voiced feature evaluation unit 210, an SNR estimation unit 206 and the speech segment determination unit 205.

The voiced feature evaluation unit 210 is a device which extracts a voiced segment, and includes the feature storage unit 202, the inter-frame feature correlation value calculation unit 203 and the difference processing unit 204.

The SNR estimation unit 206 estimates the SNR of an input signal based on the correlation value corrected using the average difference outputted from the difference processing unit 204. The SNR estimation unit 206 outputs the corrected correlation value outputted from the difference processing unit 204 to the speech segment determination unit 205 when it is estimated that the SNR is low, while it does not output the corrected correlation value to the speech segment determination unit 205 but determines the speech segment based on the corrected correlation value outputted from the difference processing unit 204 when it is estimated that the SNR is high. This is because an input signal has a property that the difference between a speech segment and a non-speech segment becomes clear when the SNR of the input signal is high.

Next, a description is given of a method for estimation of the SNR of an input signal by the SNR estimation unit 206. When the average value of correlation values calculated by the difference processing unit 204 is smaller than the threshold value, the SNR estimation unit 206 estimates that the SNR is high, and when the average value is equal to or larger than the threshold value, it estimates that the SNR is low. This is because the following reasons. When the average value of correlation values is calculated over a time period longer enough than the duration of one utterance (for example, five seconds), the correlation values decrease in the noise segment in a high SNR environment, so the average value of these correlation values also decreases. On the other hand, in a low SNR environment having a periodic noise or the like, the correlation values increase in the noise segment, so the average value of these correlation values also increases. Using this property of linkage between the average value of correlation values and the SNR, it becomes possible to easily estimate the SNR just by evaluating one already-calculated parameter.

Figure 8:
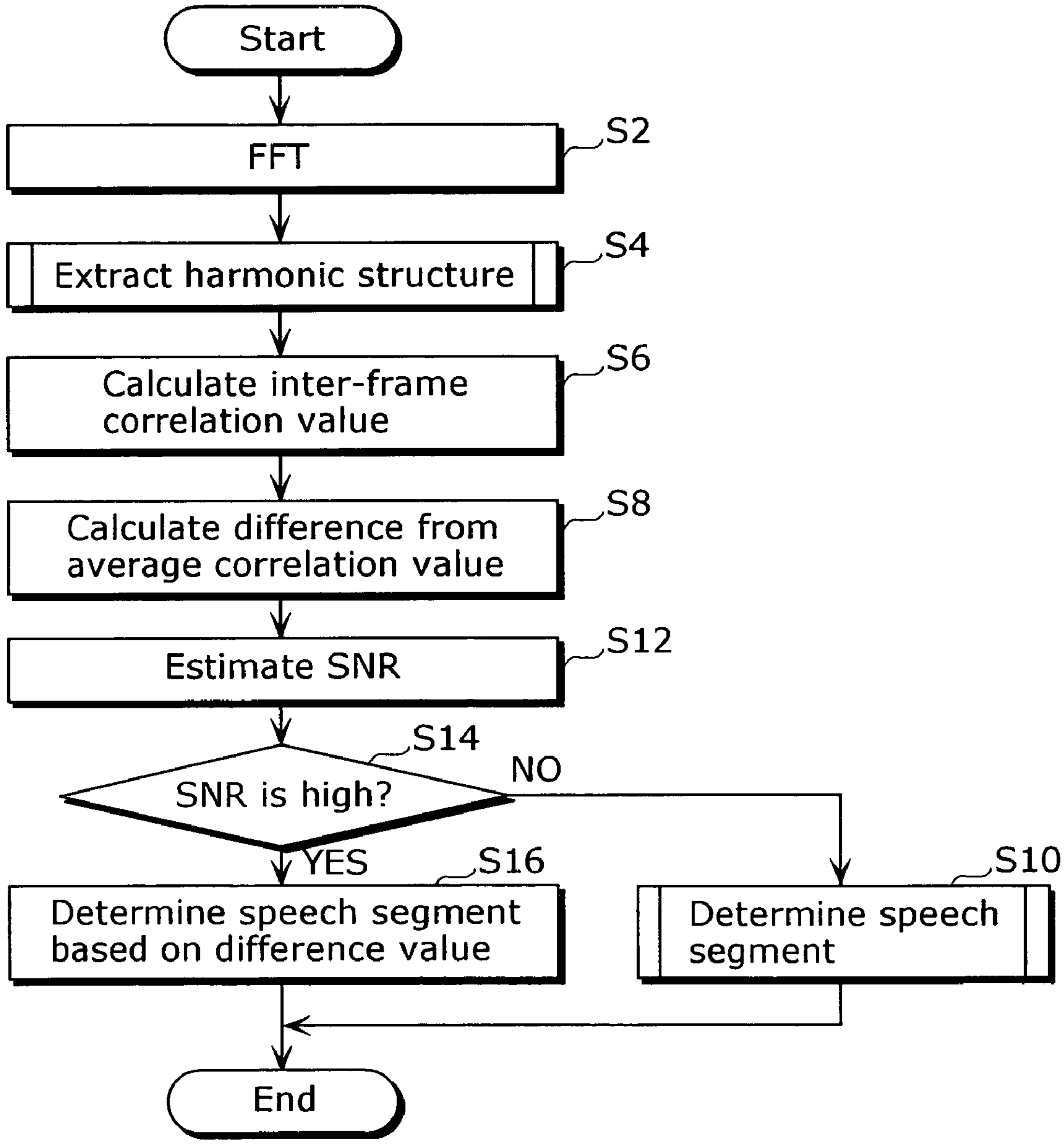
FIG. 8 is a flowchart of processing performed by the speech segment detection device according to the second embodiment.

The operation of the speech segment detection device 30 structured as above is described below. FIG. 8 is a flowchart of the processing performed by the speech segment detection device 30.

The operations of the speech segment detection device 30 from the FFT processing by the FFT unit 200 (S2) through the corrected correlation value calculation processing by the difference processing unit 204 (S8) are same as those of the speech segment detection device 20 of the first embodiment shown in FIG. 2. Therefore, the detailed description thereof is not repeated here.

Next, the SNR estimation unit 206 estimates the SNR of the input signal according to the above method (S12). When it is estimated that the SNR is high (YES in S14), the SNR estimation unit 206 determines that a segment of the corrected correlation value which is larger than a predetermined threshold value is a speech segment. When it estimates that the SNR is low (NO in S14), it performs the same processing as the speech segment determination processing (S10 in FIG. 2) performed by the speech segment determination unit 205 in the first embodiment which are described with reference to FIG. 2 and FIG. 6, and determines speech segments (S10).

As described above, the present embodiment brings about the advantage that there is no need to perform the speech segment determination processing based on the continuity and duration of speech segments, in addition to the advantages described in the first embodiment. Therefore, it becomes possible to detect speech segments almost in real time.

Third Embodiment

A description is given below, with reference to the drawings, of a speech segment detection device according to the third embodiment of the present invention. The speech segment detection device according to the present embodiment is capable not only of determining speech segments having harmonic structures but also of distinguishing particularly between music and human voices.

Figure 9:
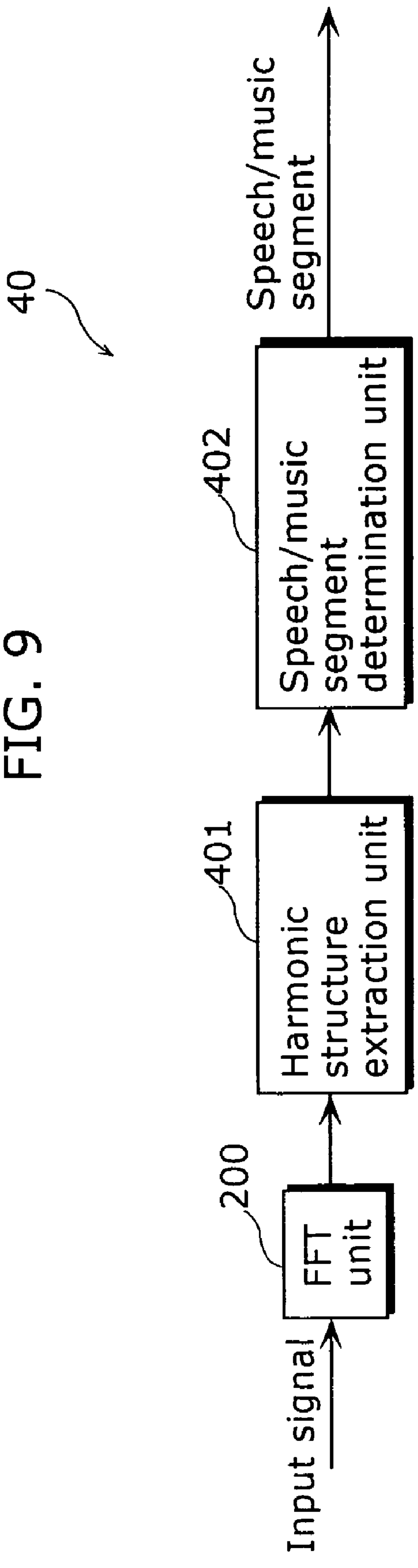
FIG. 9 is a block diagram showing a hardware structure of a speech segment detection device according to a third embodiment.

FIG. 9 is a block diagram showing a hardware structure of a speech segment detection device 40 according to the present embodiment. The speech segment detection device 40 is a device which determines, in an input signal, a speech segment which is a segment during which a man vocalizes and a music segment which is a segment of music. It includes the FFT unit 200, a harmonic structure extraction unit 401 and a speech/music segment determination unit 402.

The harmonic structure extraction unit 401 is a processing unit which outputs values indicating harmonic structure features, based on the power spectral components extracted by the FFT unit 200. The speech/music segment determination unit 402 is a processing unit which determines speech segments and music segments based on the values indicating the harmonic structures outputted from the difference processing unit 204.

Figure 10:
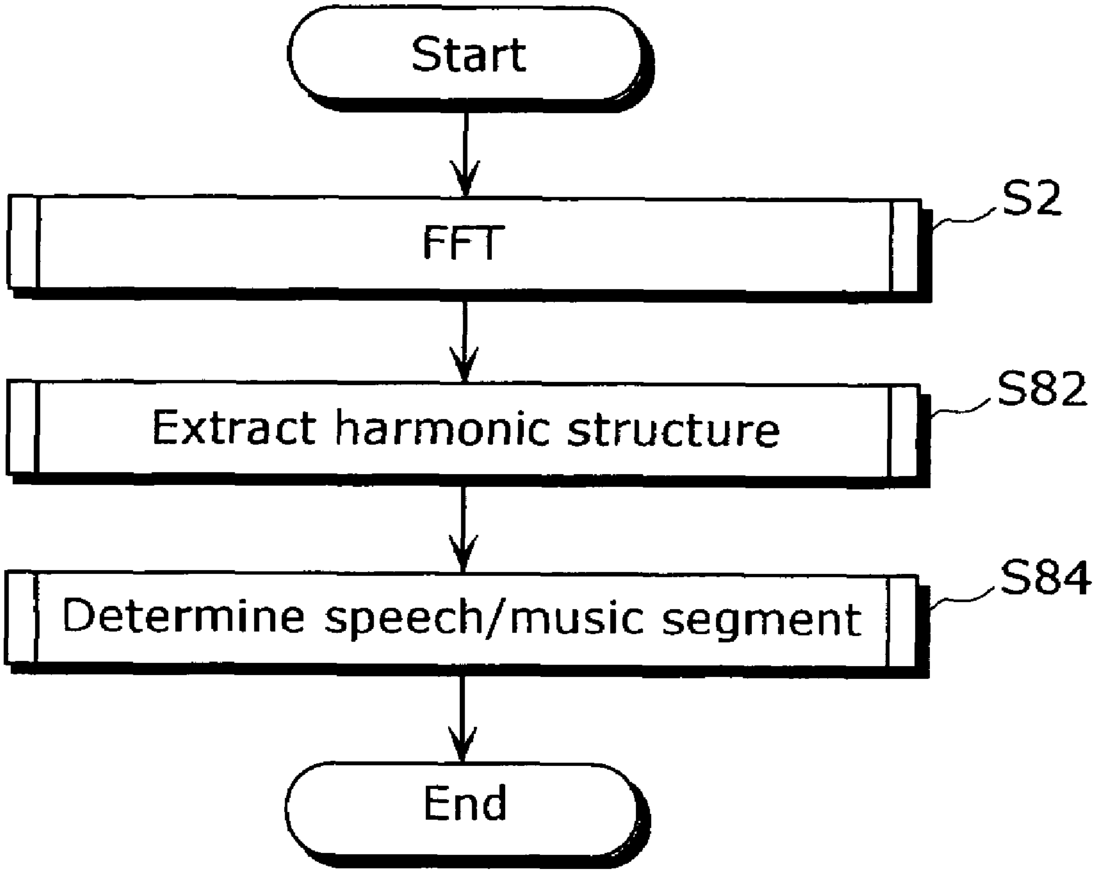
FIG. 10 is a flowchart of processing performed by the speech segment detection device.

The operation of the speech segment detection device 40 structured as above is described below. FIG. 10 is a flowchart of the processing performed by the speech segment detection device 40.

The FFT unit 200 obtains, as acoustic features used for extraction of harmonic structures, power spectral components by performing FFT on an input signal (S2).

Next, the harmonic structure extraction unit 401 extracts the values indicating the harmonic structures from the power spectral components extracted by the FFT unit 200 (S82). The harmonic structure extraction processing (S82) is described later in detail.

The harmonic structure extraction unit 401 determines speech segments and music segments based on the values indicating the harmonic structures (S84). The speech/music segment determination processing (S84) is described later in detail.

Figure 11:
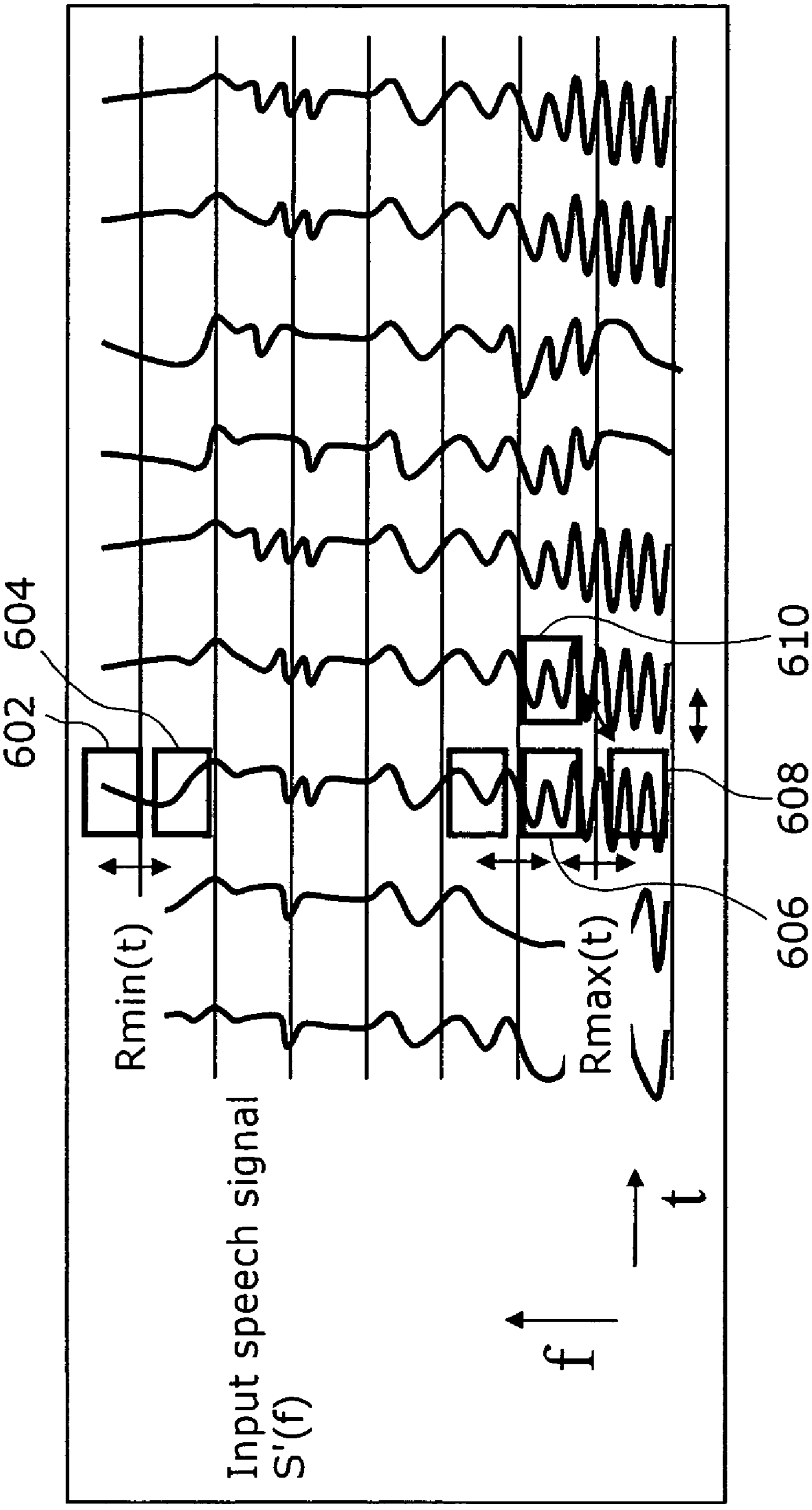
FIG. 11 is a diagram for explaining harmonic structure extraction processing.

Next, a detailed description of the above-mentioned harmonic structure extraction processing is given below (S82). In the harmonic structure extraction processing (S82), the value indicating the harmonic structure feature is obtained based on the correlation between frequency bands when the power spectral component is divided into a plurality of frequency bands. The value indicating the harmonic structure feature is obtained using this method because of the following reason. When it is assumed that the harmonic structure is seen in the frequency band which clearly shows the effect of the signal of speech generated by the vocal fold vibration that is the source of that harmonic structure, it can be estimated that there is a high correlation of power spectral components between adjacent frequency bands. In other words, as shown in FIG. 11, in the case where the power spectral component indicated on the vertical axis is separated into a plurality of frequency bands (the number of frequency bands is 8 in this diagram) in each frame indicated on the horizontal axis, there is a high correlation between the frequency bands with harmonic structures (for example, between the band 608 and the band 606), while there is a low correlation between the frequency bands without harmonic structures (for example, between the band 602 and the band 604).

Figure 12:
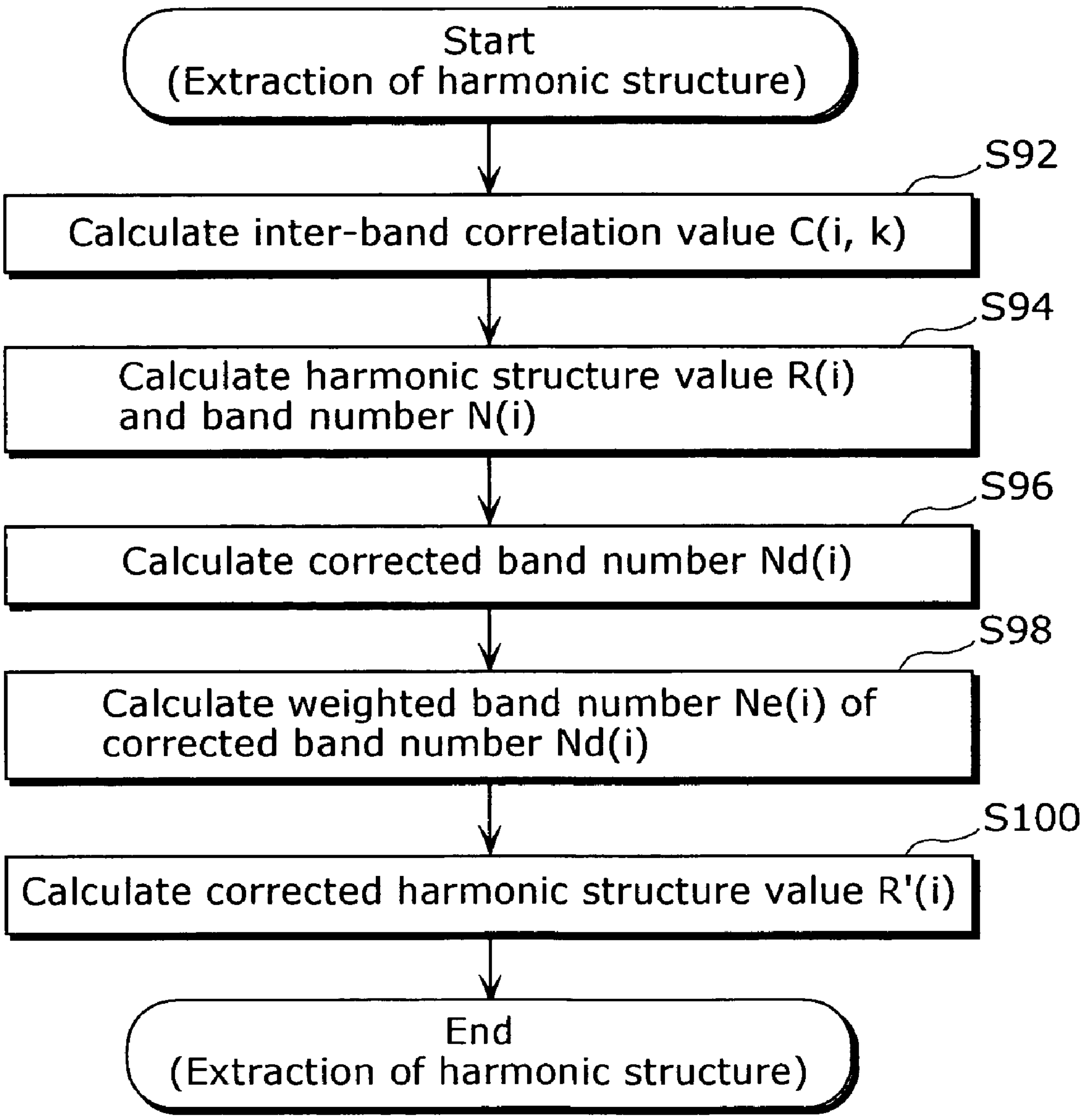
FIG. 12 is a flowchart showing the details of the harmonic structure extraction processing.

FIG. 12 is a flowchart showing the details of the harmonic structure extraction processing (S82). The harmonic structure extraction unit 401 calculates each inter-band correlation value C(i, k) in each frame, as mentioned above (S92). The inter-band correlation value C(i, k) is represented by the following equation (6).

$$C(i,k)=\max(Xcorr(P(i,L*(k-1)+1:L*k),P(i,L*k+1:L*(k+1)))) \qquad (6)$$

Here, P(i, x:y) represents a vector sequence where a frequency component x:y (larger than x and smaller than y) in a power spectrum in a frame i. L represents a bandwidth, and max(Xcorr(•)) represents the maximum value of correlation coefficients between vector sequences.

Since there is a high correlation between adjacent frequency bands with harmonic structures, the inter-band correlation value C(i, k) indicates a larger value. On the contrary, since there is a low correlation between adjacent frequency bands without harmonic structures, the inter-band correlation value C(i, k) indicates a smaller value.

Note that the inter-band correlation value C(i, k) may be obtained by the following equation (7).

$$C(i,k)=\max(Xeorr(P(i,L*(k-1)+1:L*k),P(i+1,L*k+1:L*(k+1)))) \qquad (7)$$

Note that the equation (6) represents the correlation of power spectral components between adjacent frequency bands in the same frame, like the band 608 and the band 606 or the band 604 and the band 602, while the equation (7) represents the correlation of power spectral components between adjacent frequency bands in adjacent frames, like the band 608 and the band 610. Based on the correlation between not only adjacent bands but also adjacent frames as shown by the equation (7), it becomes possible to calculate the correlation between bands and the correlation between frames at the same time.

Furthermore, the inter-band correlation value C(i, k) may be calculated by the following equation (8).

$$C(i,k)=\max(Xcorr(P(i,L*(k-1)+1:L*k),P(i,L*(k-1)+1:L*(k+1)))) \qquad (8)$$

The equation (8) represents the correlation of power spectra in the same frequency band between adjacent frames.

Next, [R(i), N(i)], that is, a pair of the harmonic structure value R(i) indicating the harmonic structure feature in the frame i and the frequency band number N(i) is obtained (S94). [R(i), N(i)] is represented by the following equation (9).

$$[R(i),N(i)]=[R1(i)-R2(i),N1(i)-N2(i)] \qquad (9)$$

Here, R1($i$) and R2($i$) are represented as follows:

$$R_1(i)=\max_{k=1 \ldots L-1}(C(i,k)); \qquad (10)$$

$$R_2(i)=\min_{k=1 \ldots L-1}(C(i,k)); \qquad (11)$$

C: Frequency band harmonic scale in frequency band k of frame i

L: Number of frequency bands

N1($i$) and N2($i$) represent the number of frequency bands in which C(i, k) has the maximum and minimum values, respectively. The harmonic structure value represented by the equation (9) is obtained by subtracting the minimum value from the maximum value of the inter-band correlation value in the same frame. Therefore, the harmonic structure value is larger in a frame with a harmonic structure, while the value is smaller in a frame without a harmonic structure. There is also an advantage in the subtraction of the minimum value from the maximum value that the inter-band correlation value is normalized. Therefore, it becomes possible to perform the normalization processing in one frame without performing the processing for obtaining the difference from the average correlation value like the processing of S8 in FIG. 2, Next, the harmonic structure extraction unit 401 calculates the corrected band numbers Nd(i) which are obtained by assigning weights on the band numbers N(i) according to the distributions thereof in the past Xc frames (S96). The harmonic structure extraction unit 401 obtains the maximum value Ne(i) of the corrected band numbers Nd(i) in the past Xc frames (S98). The maximum value Ne(i) is hereinafter referred to as a weighted band number.

The corrected band number Nd(i) and the weighted band number Ne(i) are obtained by the following equations in the case of Xc=5.

$$Nd(i)=\operatorname*{median}_{k=i-Xc:i}(N(k))-\operatorname*{var}_{k=i-Xc:i}(N(k)); \qquad (12)$$

$$Ne(i)=\max_{k=i:i+Xc}(Nd(k)); \qquad (13)$$

Nd: Frequency band number corrected based on distribution

Ne: Maximum value of band numbers Nd of past Xc frames corrected based on distribution Xc: Frame width for distribution calculation In the segment without a harmonic structure, the band numbers N(i) are distributed widely. Therefore, the value of the corrected band numbers Nd(i) become smaller (for example, minus values), and the value of the weighted band number Ne(i) becomes smaller accordingly.

Furthermore, the harmonic structure extraction unit 401 corrects the harmonic structure value R(i) with the weighted band number Ne(i) so as to calculate the corrected harmonic structure value R'(i) (S100). The corrected harmonic structure value R'(i) is obtained by the following equation (14). Note that as the harmonic structure value R(i), the value calculated in S8 may be used here.

$$R'(i)=R(i)*Ne(i) \quad (14)$$

Figure 13:
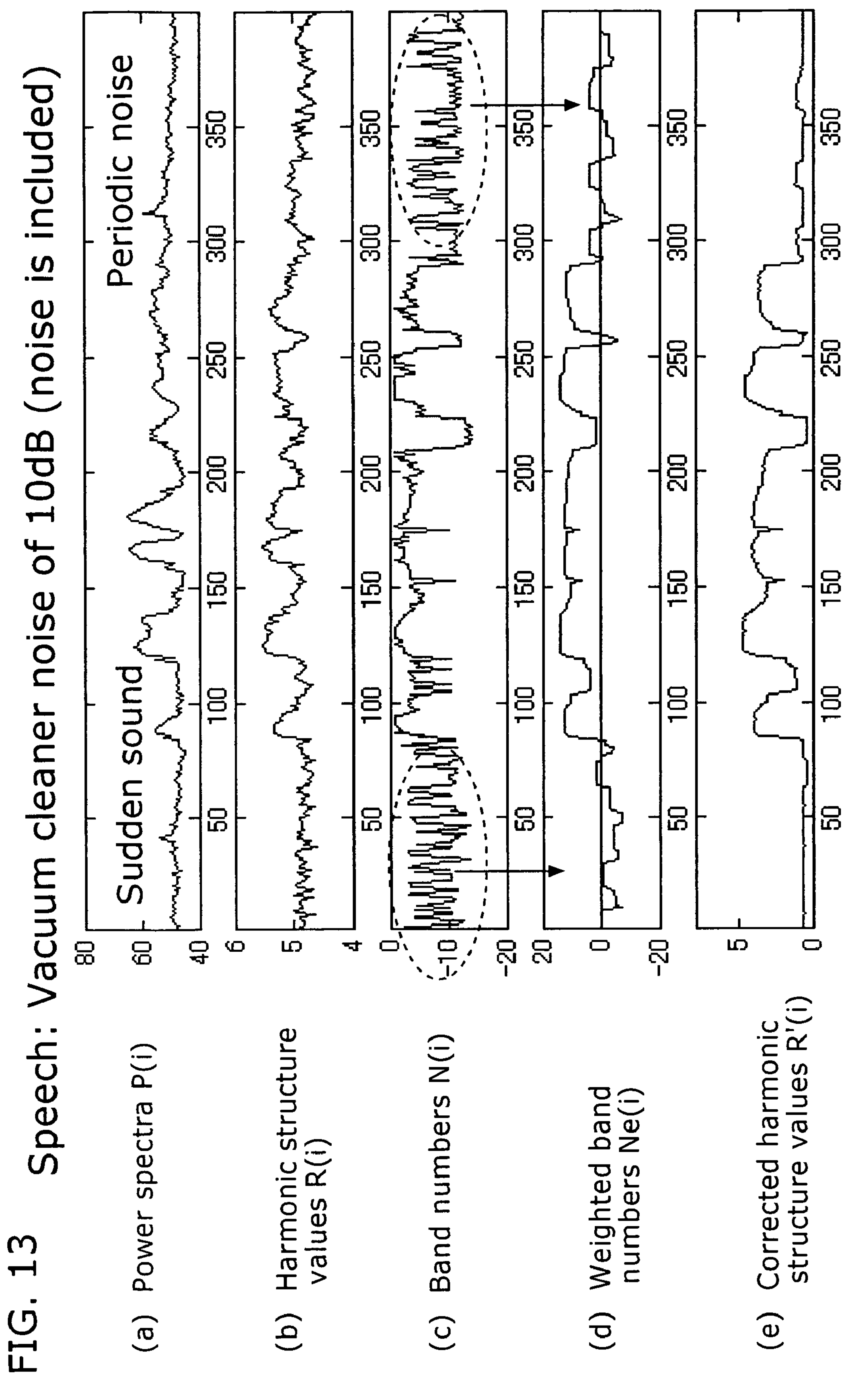
FIG. 13 (*a*) is a diagram showing power spectra of an input signal.
Figure 14:
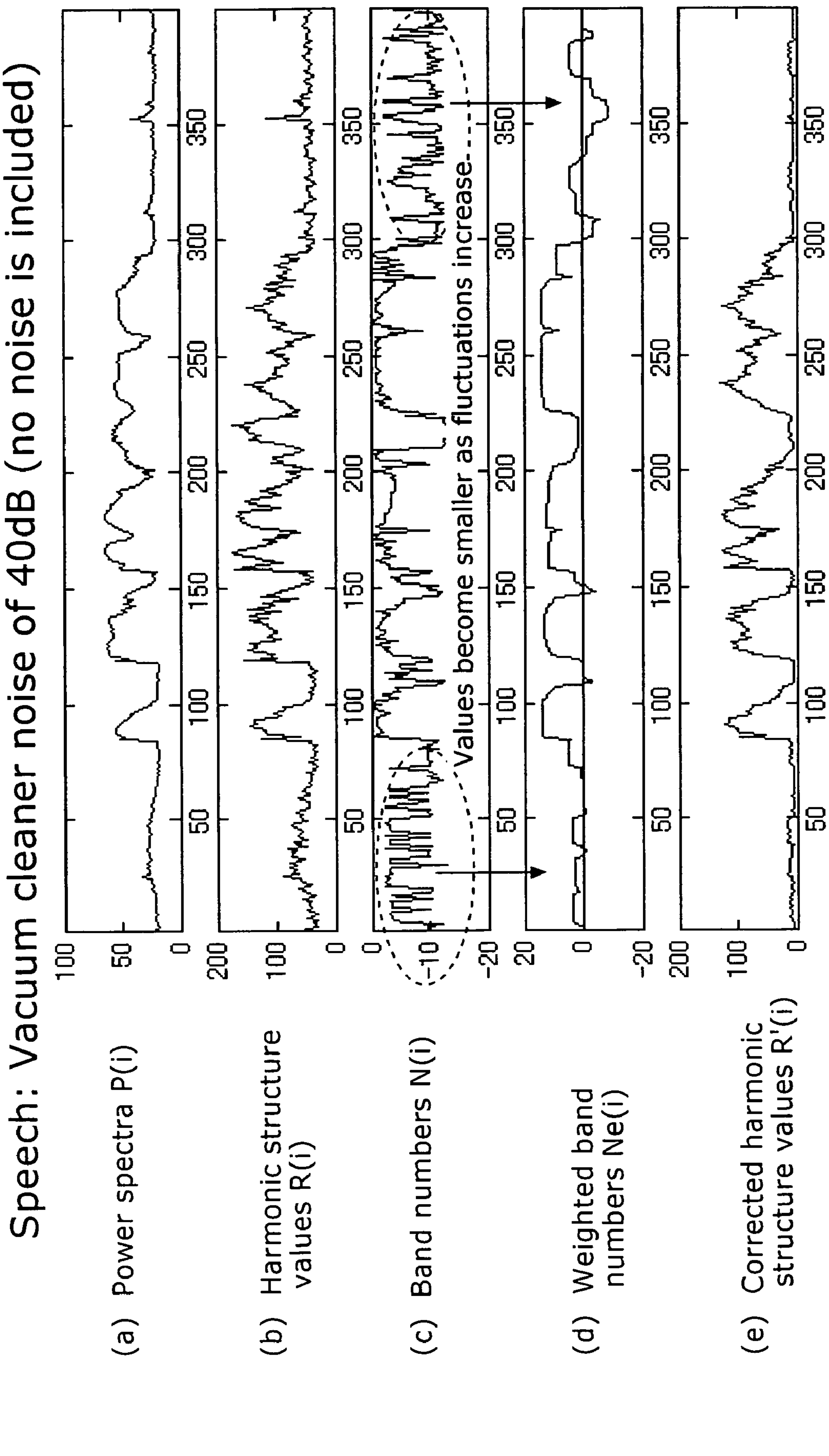
FIG. 14 (*a*) is a diagram showing power spectra of an input signal.
Figure 15:
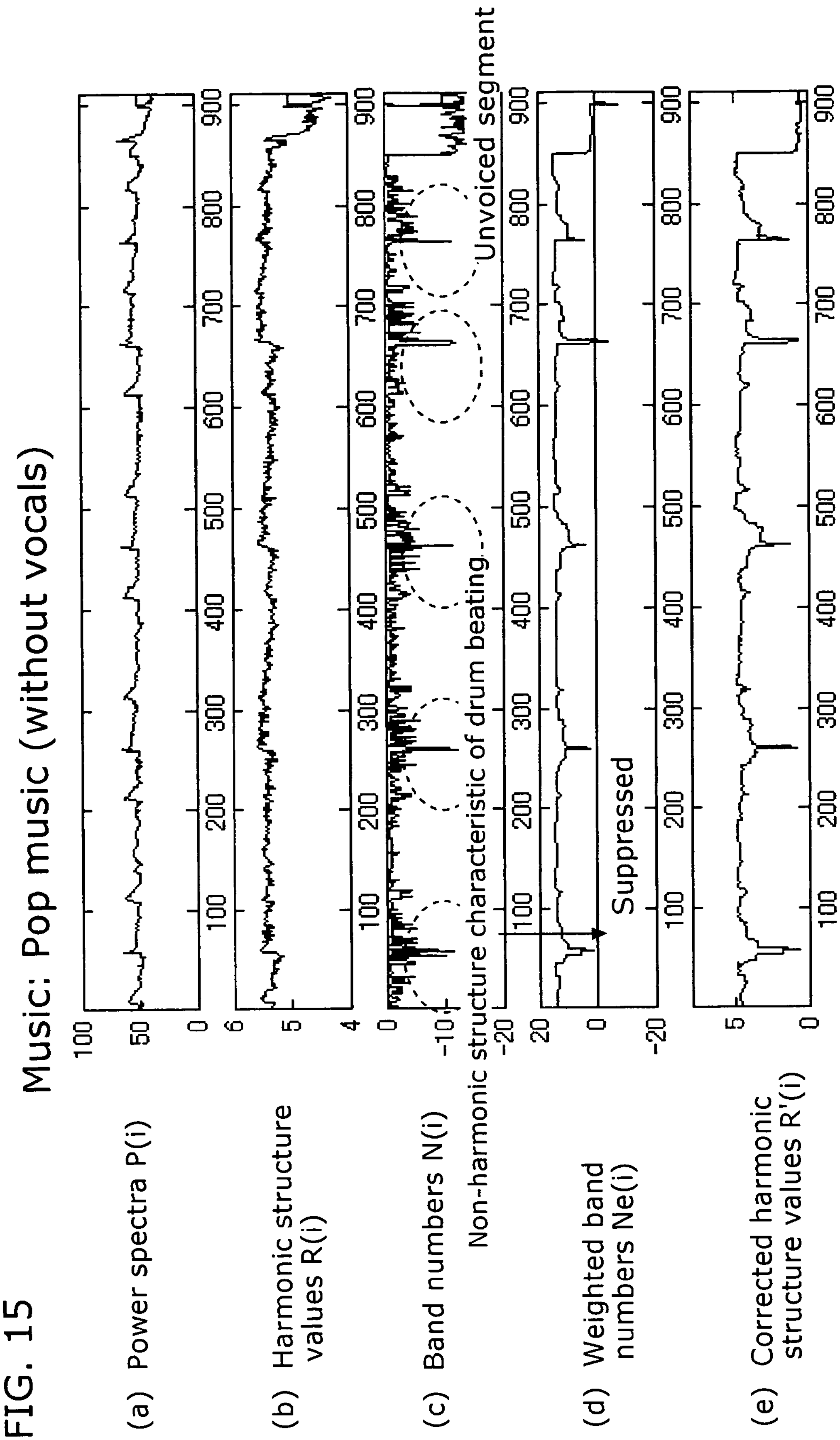
FIG. 15 (*a*) is a diagram showing power spectra of an input signal.

FIG. 13 to FIG. 15 are diagrams showing the experimental results of the above-mentioned harmonic structure extraction processing (S82).

FIG. 13 is a diagram showing an experimental result in the case where a man utters a sound in an environment with vacuum cleaner noise (SNR=10 dB). It is assumed that a sudden sound "click" which is made when the vacuum is turned on appears around the 40th frame, and the sound level of the vacuum increases and a periodic noise appears around 280th frame when the rotation speed of the motor is changed from low to high. It is also assumed that the man utters sounds during the period from the 80th frame to the 280th frame.

FIG. 13 (*a*) shows power spectra of an input signal, FIG. 13 (*b*) shows harmonic structure values R(i), FIG. 13 (*c*) shows band numbers N(i), FIG. 13 (*d*) shows weighted band numbers Ne(i), and FIG. 13 (*e*) shows corrected harmonic structure values R'(i). Note that the band numbers shown in FIG. 13 (*c*) indicate lower frequencies as they come close to 0 because they are obtained by multiplying the actual band numbers by −1 for better showing.

As shown in FIG. 13 (*c*), in parts in which a sudden sound and a periodic noise appear (parts enclosed by broken lines in this diagram), the band numbers N(i) fluctuate largely. Therefore, as shown in FIG. 13 (*d*), the weighted band numbers Ne(i) corresponding to those parts have smaller values, and the corrected harmonic structure values decrease accordingly, as shown in FIG. 13 (*e*).

FIG. 14 is a diagram showing an experimental result in the case where the same sound is produced as that in FIG. 13 in an environment in which a noise of a vacuum cleaner hardly appears. Also in this environment, the corrected harmonic structure values R'(i) in the parts without harmonic structures are smaller (FIG. 14 (*e*)), as is the case with FIG. 13.

FIG. 15 is a diagram showing an experimental result of music without vocals. Music has harmonic structures because harmonies are outputted, but it does not have a harmonic structure in the segment during which a drum is beaten or the like. FIG. 15 (*a*) shows power spectra of an input signal, FIG. 15 (*b*) shows harmonic structure values R(i), FIG. 15 (*c*) shows band numbers N(i), FIG. 15 (*d*) shows weighted band numbers Ne(i), and FIG. 15 (*e*) shows corrected harmonic structure values. Note that the band numbers shown in FIG. 15 (*c*) indicate the lower frequencies as the values thereof come close to 0 for the same reason as FIG. 13 (*c*). In the sections enclosed with broken lines, harmonic structures are lost due to the beating of the drum. As a result, the weighted band numbers Ne(i) decrease in those sections, as shown in FIG. 15 (*d*). Therefore, as shown in FIG. 15 (*e*), the corrected harmonic structure values R'(i) also decrease. The corrected harmonic structure values R'(i) decrease in the unvoiced segment, too.

Note that in the processing of S94, it is also possible to obtain a pair [R(i), N(i)] of a harmonic structure value R(i) and a band number N(i) indicating a harmonic structure in a frame i according to the following equation (15).

$$[R(i),N(i)]=[=R1(i)-R2(i),N1(i)-N2(i)] \quad (15)$$

Here, R1(*i*) and R2(*i*) are represented as follows:

$$R_1(i)=\sum_{k=1\ldots NSP}(C(i,k)) \quad (16)$$

$$R_2(i)=\sum_{k=L-NSP\ldots L-1}(C(i,k)) \quad (17)$$

C: Frequency band harmonic scale in band k of frame i

L: Number of bands

NSP: Number of bands which are assumed to be speech pitch frequency bands

N1(*i*) and N2(*i*) represent the maximum and minimum numbers of bands at which C(i, k) has the maximum value and the minimum value respectively.

Note that R1(*i*) or R2(*i*) may be a harmonic structure value R(i).

Figure 16:
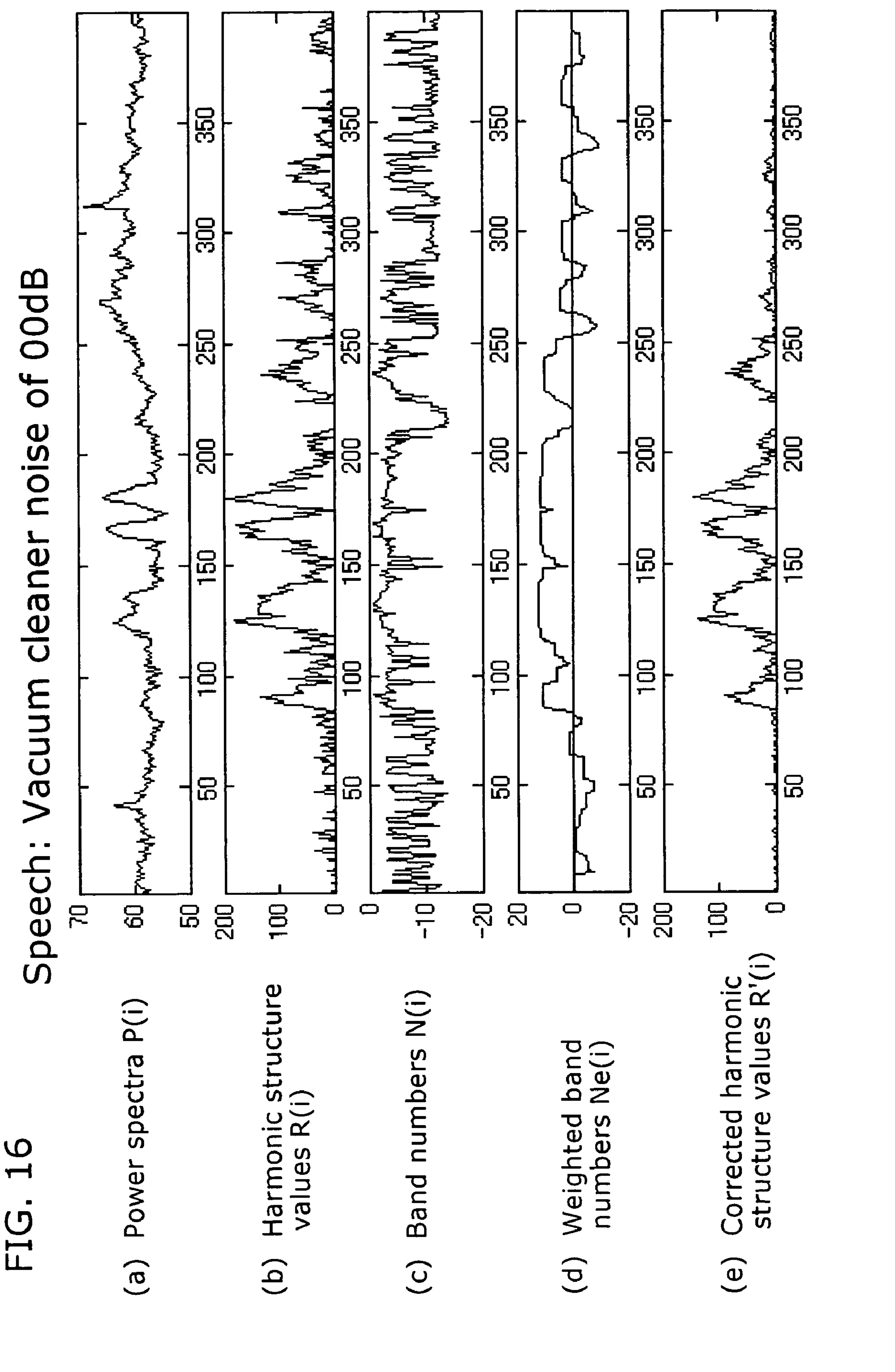
FIG. 16 (*a*) is a diagram showing power spectra of an input signal.

FIG. 16 shows an experimental result in which weighted harmonic structure values R'(i) are obtained according to the equation (15). FIG. 16 is a diagram showing an experimental result in the case where a man utters a sound in an environment in which there is quite considerable noise of a vacuum cleaner (SNR=0 dB). Note that the timing at which the man utters the sound and the timings at which the sudden sound and periodic noise of the vacuum cleaner appear are same as those shown in FIG. 13. The values shown here are obtained in the equation (15) in the case of L=16 and NSP=2.

In this case, the weighted harmonic structure values R'(i) are larger values in the frames in which the man utters the sounds, while they are smaller values in the frames in which the sudden sound and periodic noise appear.

Figure 17:
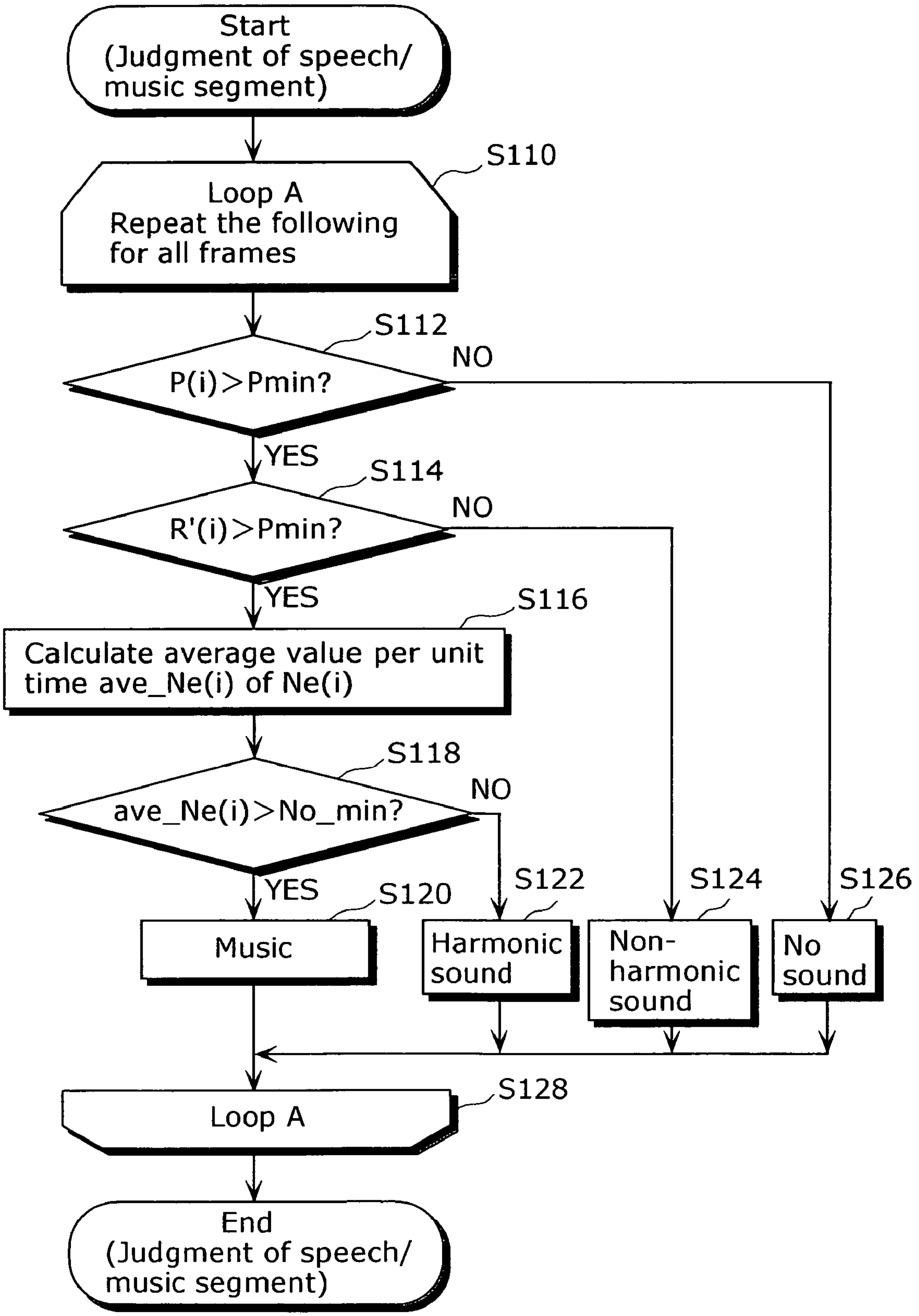
FIG. 17 is a detailed flowchart of speech/music segment determination processing.

Next, a detailed description is given below of the speech/music segment determination processing (S84 in FIG. 10). FIG. 17 is a detailed flowchart of the speech/music segment determination processing (S84 in FIG. 10).

The speech/music segment determination unit 402 checks whether or not a power spectrum P(i) in a frame i is larger than a predetermined threshold value Pmin (S112). When the power spectrum P(i) is equal to or smaller than the predetermined threshold value Pmin (NO in S112), it judges that the frame i is a silent (unvoiced?) frame (S126). When the power spectrum P(i) is larger than the predetermined threshold value Pmin (YES in S112), it judges whether or not the corrected harmonic structure value R'(i) is larger than a predetermined threshold value Rmin (S114).

When the corrected harmonic structure value R'(i) is equal to or smaller than the predetermined threshold value Rmin (NO in S114), the speech/music segment determination unit 402 judges that the frame i is a frame of a sound without a harmonic structure (S124). When the corrected harmonic structure value R'(i) is larger than the predetermined threshold value Rmin (YES in S114), the speech/music segment determination unit 402 calculates the average value per unit time ave_Ne(i) of the weighted band numbers Ne(i) (S116), and checks whether or not the average value per unit time ave_Ne(i) is larger than a predetermined threshold value Ne_min (S118). Here, ave_Ne(i) is obtained according to the following equation. It represents the average value of Ne(i) in d frames (50 frames here) including the frame i.

$$\text{ave\_Ne}(i)=\underset{k=i-d:i}{\text{average}}(Ne(i)); \quad (18)$$

d: Number of frames for which average value per unit time is obtained

When ave_Ne(i) is larger than the predetermined threshold value Ne_min (YES in S118), it is judged to be music (S120), and in other cases (NO in S118), it is judged to be a sound like human voices with harmonic structures (S122). The above-mentioned processing (S112 to S126) is repeated for all the frames (S110 to S128).

Note that music and speech are separated in sounds with harmonic structures based on the sizes of the values ave_Ne(i) because of the following fact. Both signals of music and speech are the sounds with harmonic structures. However, in speech, voiced sound and unvoiced sound appear repeatedly, so the harmonic structure values are larger in the voiced sound part and smaller in the unvoiced sound part, and these two parts appear alternately at short segments. On the other hand, in music, harmonies are outputted continuously, so the part with harmonic structure continues for a relatively long time and thus the larger harmonic structure values are maintained. This shows that the harmonic structure values do not fluctuate so much in music, while they fluctuate a lot in speech. In other words, the average value per unit time of the weighted band numbers Ne(i) is larger in music than in speech.

Note that it is also possible to distinguish between speech and music by focusing attention on the temporal continuity of harmonic structure values. In other words, it is possible to check how many frames have the smaller harmonic structure values per unit time. For that purpose, the number of frames in which the weighted band number Ne(i) is a negative value per unit time, for example may be counted. In the case where the number of frames in which the weighted band number Ne(i) is negative per unit among the frames (past 50 frames including the current frame i, for example) is Ne_count(i), it is possible to calculate Ne_count(i) instead of ave_Ne(i) in S116, and determine the segment to be speech when the number of frames Ne_count(i) is larger than a predetermined threshold value in S118 while determine the segment to be music when the number of frames is equal to or smaller than the predetermined threshold value.

As described above, in the present embodiment, a power spectral component in each frame is divided into a plurality of frequency bands and correlations between bands are obtained. Therefore, it becomes possible to extract the frequency band in which the effect of a signal of speech generated by vocal fold vibration is properly reflected, and thus to extract a harmonic structure without fail.

Furthermore, it becomes possible to judge whether a sound with a harmonic structure is music or speech, based on the fluctuation or continuity of harmonic structures.

Fourth Embodiment

Next, a description is given, with reference to the drawings, of a speech segment detection device according to the fourth embodiment of the present invention. The speech segment detection device in the present embodiment determines speech segments with harmonic structures based on the distribution of harmonic structure values.

Figure 18:
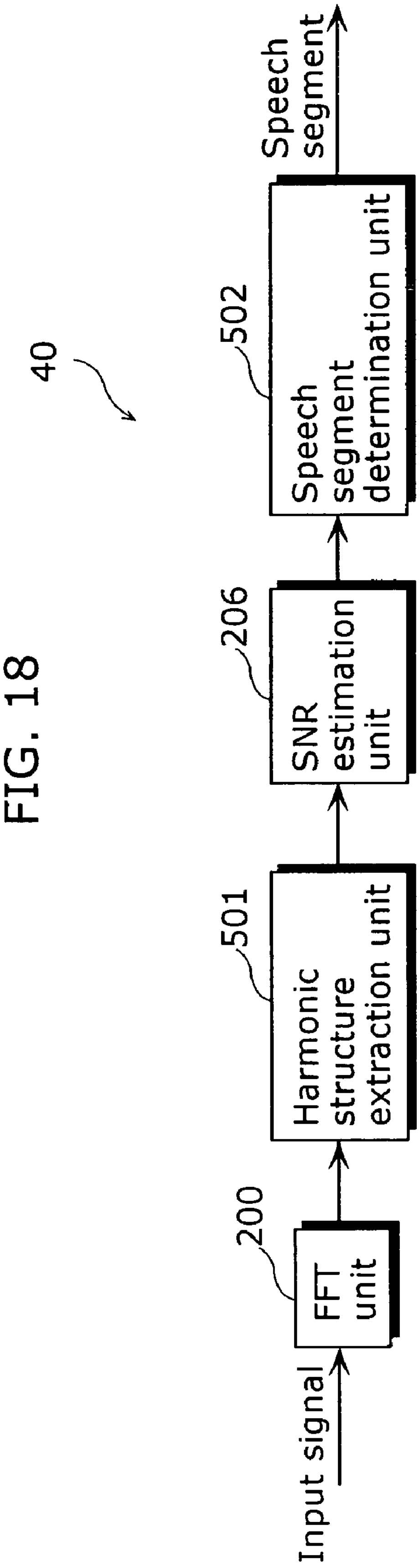
FIG. 18 is a block diagram showing a hardware structure of a speech segment detection device according to a fourth embodiment.

FIG. 18 is a block diagram showing a hardware structure of a speech segment detection device 50 according to the fourth embodiment. The speech segment detection device 50 is a device which detects speech segments with harmonic structures in an input signal, and includes the FFT unit 200, a harmonic structure extraction unit 501, the SNR estimation unit 206 and a speech segment determination unit 502.

The harmonic structure extraction unit 501 is a processing unit which outputs the values indicating harmonic structures based on the power spectral components outputted from the FFT unit 200. The speech segment determination unit 502 is a processing unit which determines speech segments based on the values indicating harmonic structures and the estimated SNR values.

Figure 19:
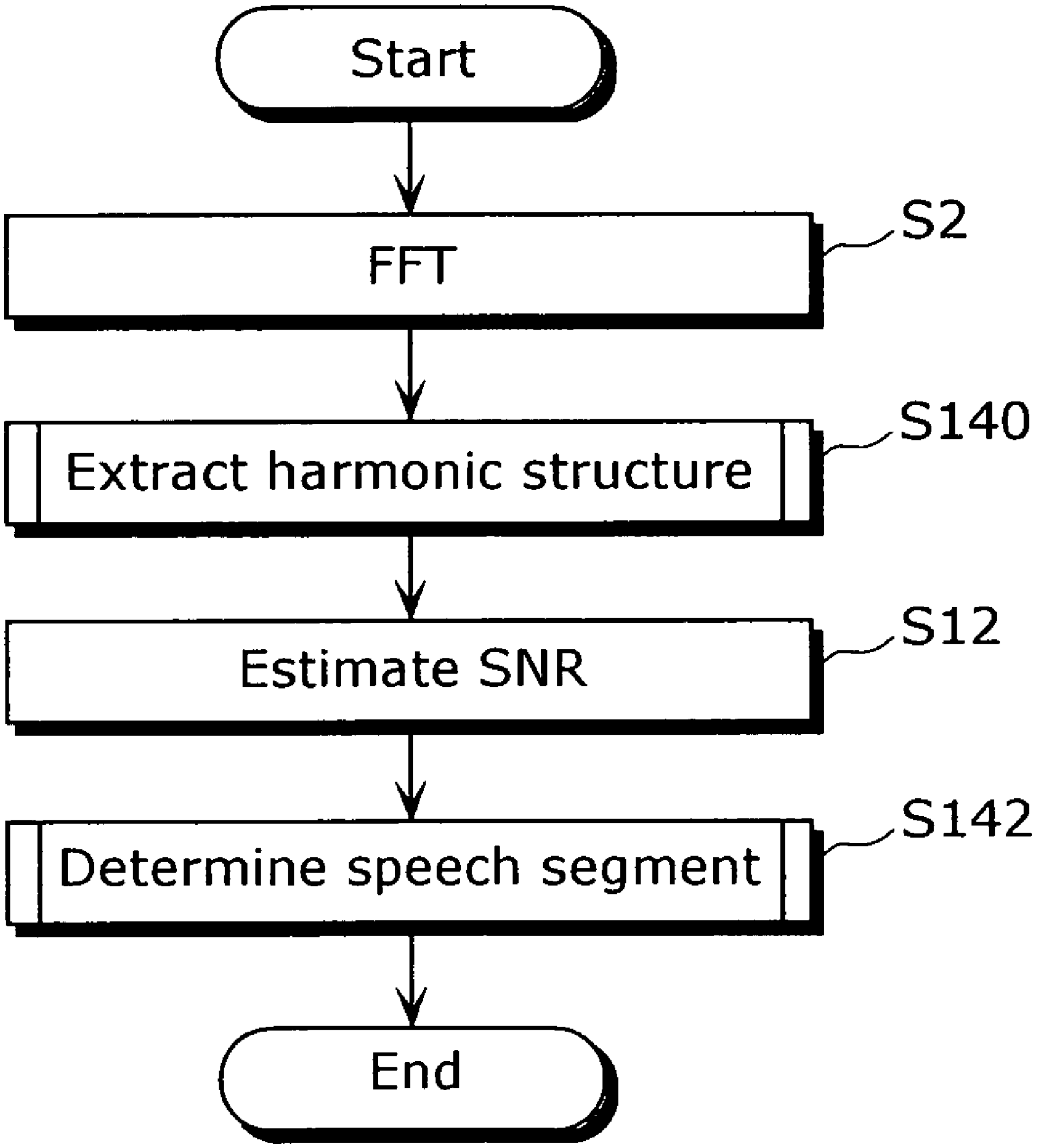
FIG. 19 is a flowchart of processing performed by the speech segment detection device.

The operation of the speech segment detection device 50 structured as above is described below. FIG. 19 is a flowchart of the processing performed by the speech segment detection device 50. The FFT unit 200 obtains the power spectral components as acoustic features to be used for extraction of harmonic structures by performing FFT on the input signal (S2).

Next, the harmonic structure extraction unit 501 extracts the values indicating harmonic structures from the power spectral components extracted by the FFT unit 200 (S140). The harmonic structure extraction processing (S140) is described later.

The SNR estimation unit 206 estimates the SNR of the input signal based on the values indicating the harmonic structures (S12). The method for estimating SNR is same as the method in the second embodiment. Therefore, a detailed description thereof is not repeated here.

The speech segment determination unit 502 determines speech segments based on the values indicating harmonic structures and the estimated SNR values (S142). The speech segment determination processing (S142) is described later in detail.

In the present embodiment, the accuracy of determining speech segments is improved by adding the evaluation of the transition segments between a voiced sound and an unvoiced sound. According to the speech segment determination method shown in FIG. 6, (1) speech segments are concatenated when the distance between them is shorter than that of a predetermined number of frames (S52), and (2) the concatenated speech segment is judged to be a non-speech segment when the duration of that segment is shorter than a predetermined time period (S60). In other words, this is the method in which it is implicitly expected that, by the processing (2), an unvoiced segment is concatenated with a speech segment which is judged to be a voiced segment in the processing (1), without evaluation of the frame between the unvoiced segment and the voiced segment.

When speech segments are seen in detail, it is deemed that speech segments can be categorized into the following three groups (Group A, Group B and Group C) according to the transition types between voiced sound, unvoiced sound and noise (non-speech segment).

Group A is a voiced sound group, and can include the following transition types: from a voiced sound to a voiced sound; from a noise to a voiced sound; and from a voiced sound to a noise.

Group B is a group of a mixture of a voiced sound and an unvoiced sound, and can include the following transition types: from a voiced sound to an unvoiced sound; and from an unvoiced sound to a voiced sound.

Group C is a non-speech group, and can include the following transition types: from an unvoiced sound to an unvoiced sound; from an unvoiced sound to a noise; from a noise to an unvoiced sound; and from a noise to a noise.

As for a sound included in Group A, only the voiced segments are determined depending on the accuracy of the values indicating their harmonic structures. On the other hand, as for a sound included in Group B, it can be expected that an unvoiced segment can also be extracted if the transition of sound around a voiced segment can be evaluated. As for a sound included in Group C, it seems to be very difficult to extract only an unvoiced sound under noise environment.

This is because the noise features cannot be defined easily or the SNR for unvoiced noise is often low.

Therefore, in the present embodiment, the sound of Group B is extracted by evaluating the transition between a voiced sound and an unvoiced sound, in addition to the method of FIG. 6 in which speech segments are determined by extracting only the sound of Group A. As a result, we believe that the accuracy of determining speech segments can be improved. Furthermore, it can be assumed that the values indicating harmonic structures significantly change in the transition segments from an unvoiced sound to a voiced sound and from a voiced sound to an unvoiced sound. Therefore, it becomes possible to recognize this change in values of harmonic structures, by using a scale of the distribution of the values indicating harmonic structures in the surroundings of the segment which is judged to be a voiced segment using these values. Here, the distribution of the values indicating harmonic structures is called a weighted distribution Ve.

Figure 20:
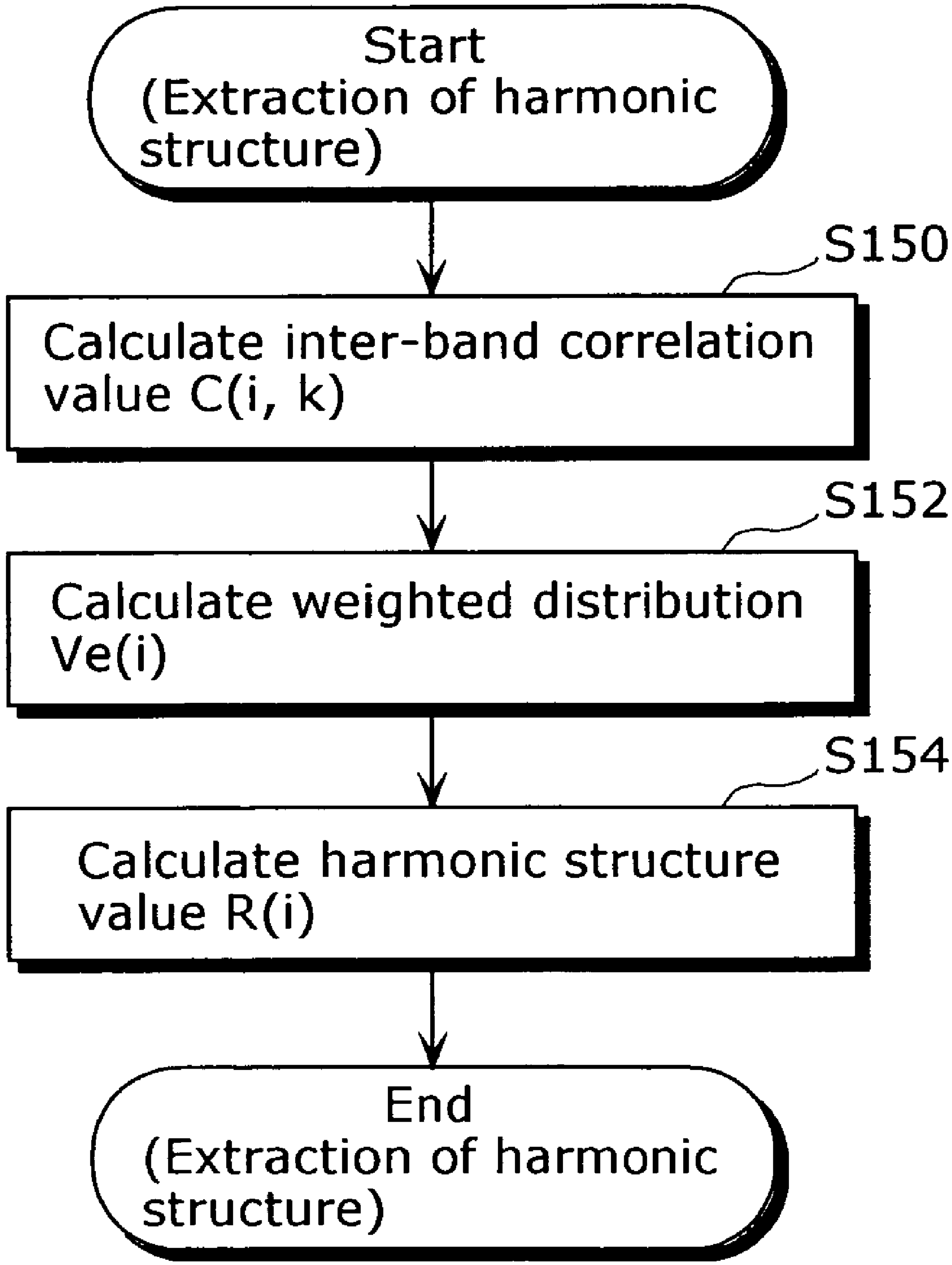
FIG. 20 is a flowchart showing the details of harmonic structure extraction processing.

Next, a detailed description of the harmonic structure extraction processing (S140 in FIG. 19) is given below. FIG. 20 is a flowchart showing the details of the harmonic structure extraction processing (S140).

The harmonic structure extraction unit 501 calculates an inter-band correlation value C(i, k) for each frame (S150). The inter-band correlation value C(i, k) is calculated in the same manner as S92 in FIG. 12. Therefore, a detailed description thereof is not repeated here.

Next, the harmonic structure extraction unit 501 calculates a weighted distribution Ve(i) using the inter-band correlation value C(i, k), according to the following equation (S152).

$$Ve(i) = \underset{k=1:L}{\mathrm{count}}\left(\mathrm{if}\ \underset{j=i-Xc:i}{\mathrm{var}}\ (C(j,k)) > \mathrm{th\_var\_change}\right) \tag{19}$$

where Xc: Frame width (=16)

L: Number of frequency bands (=16)

th_var_change: Threshold value

It is assumed that a function var( ) is a function representing the distribution of values in the parentheses, and a function count( ) is a function for counting the number of satisfied conditions among the conditions in the parentheses.

Finally, the harmonic structure extraction unit 501 calculates the harmonic structure value R(i) (S154). This calculation method is same as S94 in FIG. 12. Therefore, a detailed description thereof is not repeated here.

Figure 21:
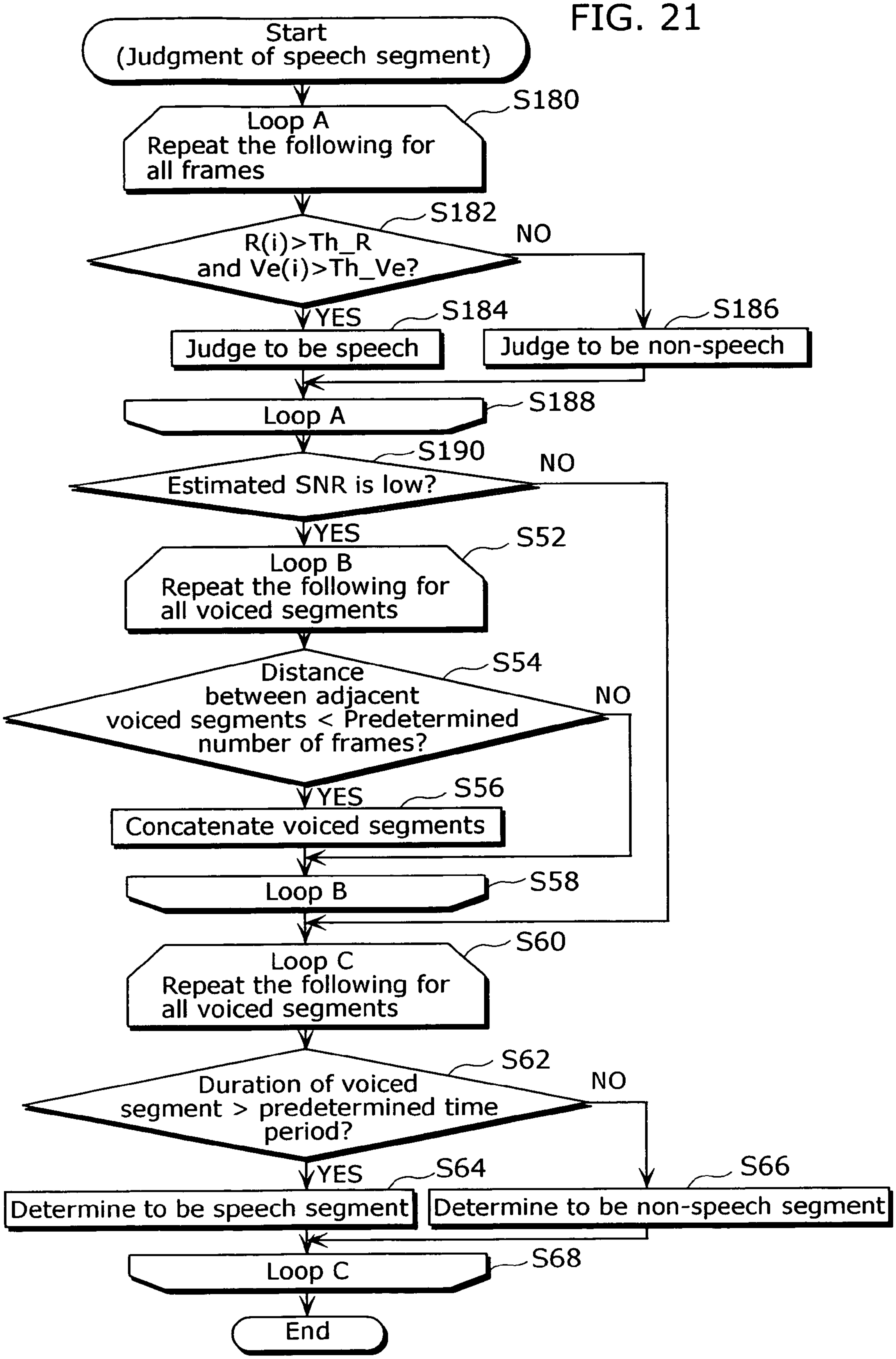
FIG. 21 is a flowchart showing the details of speech segment determination processing.

Next, a description of the speech segment determination processing (S142 in FIG. 19) is given with reference to FIG. 21. The speech segment determination unit 502 judges whether or not R(i) of a frame i is larger than a threshold value Th_R and whether or not Ve(i) is larger than a threshold value Th_ve (S182). When the above-mentioned conditions are both satisfied (YES in S182), the speech segment determination unit 502 judges that the frame i is a speech frame, and when the conditions are not satisfied, it judges that the frame i is a non-speech frame (S186). The speech segment determination unit 502 performs the above-mentioned processing for all the frames (S180 to S188). Next, the speech segment determination unit 502 judges whether the SNR estimated by the SNR estimation unit 206 is low or not (S190), and when the estimated SNR is low, it performs the processing of Loop B and Loop C (S52 to S68). The processing of Loop B and Loop C is same as that shown in FIG. 6. Therefore, a detailed description thereof is not repeated here.

Note that when the estimated SNR is high (NO in S190), it omits Loop B and performs only the processing of Loop C (S60 to S68).

Figure 22:
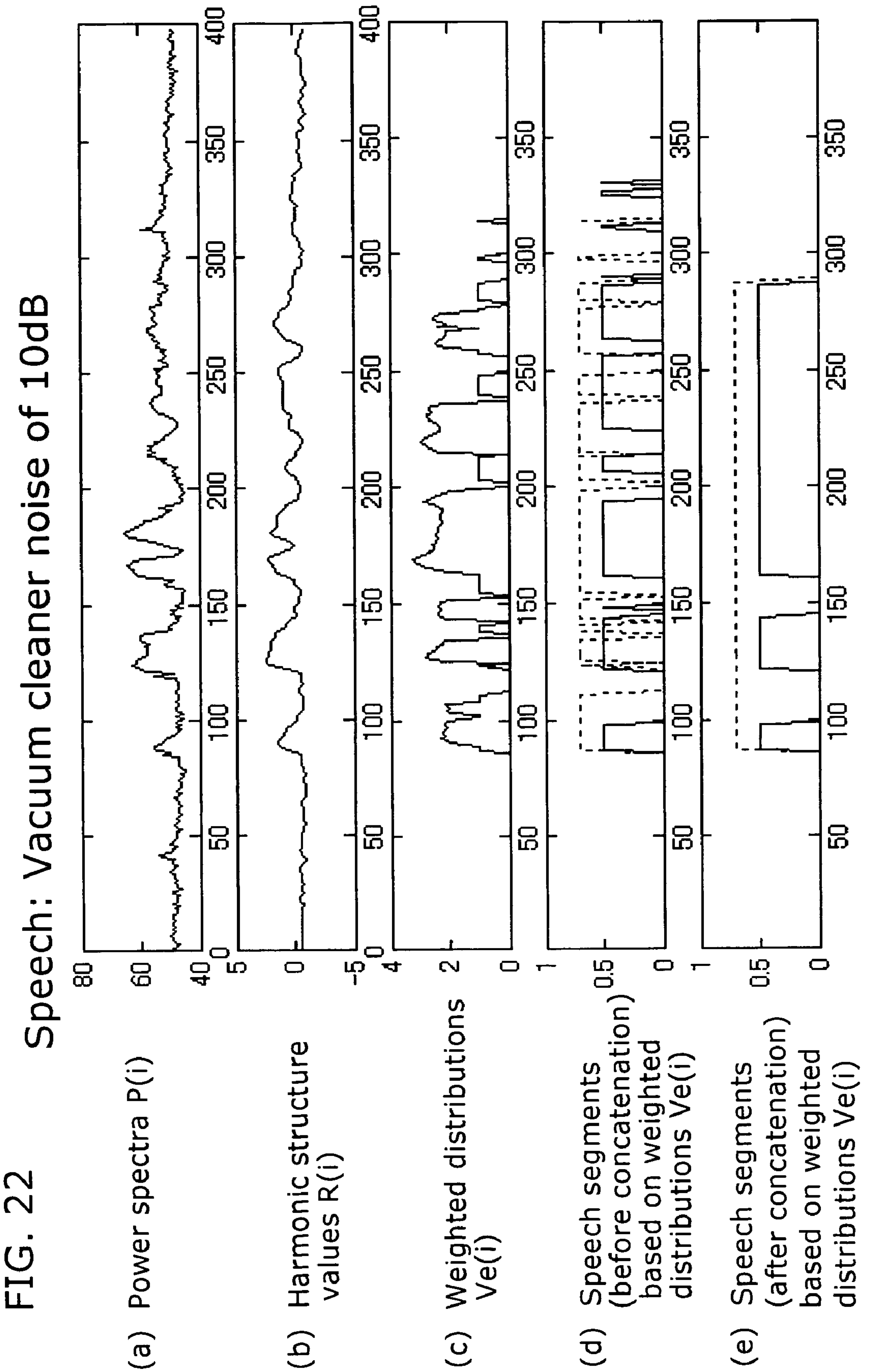
FIG. 22 (*a*) is a diagram showing power spectra of an input signal.
Figure 23:
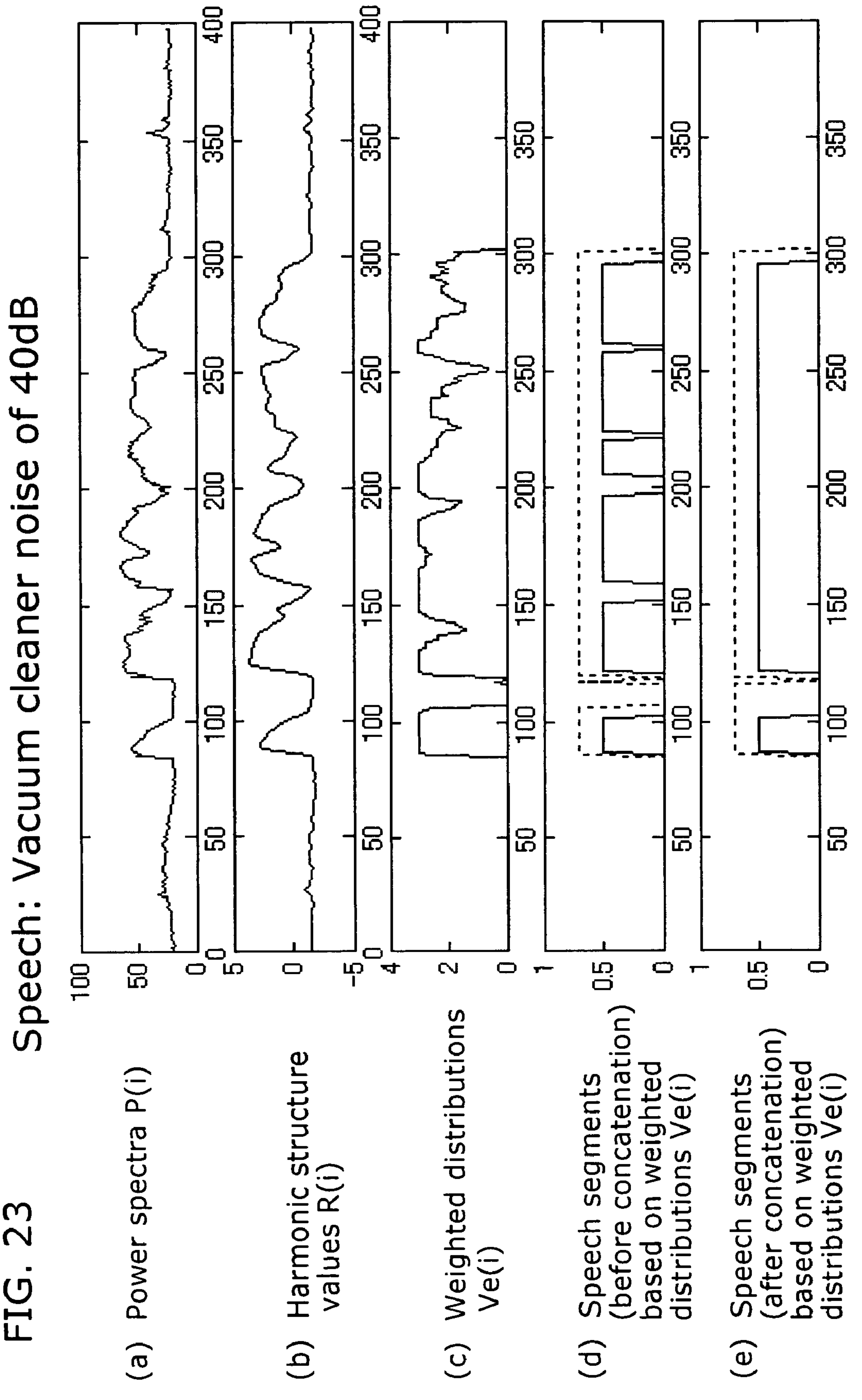
FIG. 23 (*a*) is a diagram showing power spectra of an input signal.

FIG. 22 and FIG. 23 are diagrams showing the results of the processing executed by the speech segment detection device 50. FIG. 22 is a diagram showing an experimental result in the case where a man utters a sound in an environment in which there is a noise of a vacuum cleaner (SNR=10 dB). It is assumed that a sudden sound "click" which is made when the vacuum is turned on appears around the 40th frame, and the sound level of the vacuum increases around the 280th frame when the rotation speed of the motor is changed from low to high and thus a periodic noise appears there. It is assumed that the man utters the sound during the segment between around the 80th frame and around the 280th frame.

FIG. 22 (*a*) shows power spectra of an input signal, FIG. 22 (*b*) shows harmonic structure values R(i), FIG. 22 (*c*) shows weighted distributions Ve(i), FIG. 22 (*d*) shows speech segments before being concatenated, and FIG. 22 (*e*) shows speech segments after being concatenated.

In FIG. 22 (*d*), solid lines indicate speech segments obtained by performing the threshold value processing (Loop A (S42 to S50) in FIG. 6) on the harmonic structure values R(i), and broken lines indicate speech segments obtained by performing the threshold value processing (Loop A (S180 to S188) in FIG. 21) on the harmonic structure values R(i) and the weighted distributions Ve(i). In FIG. 22 (*e*), a broken line indicates a processing result obtained after concatenating the speech segments indicated by the broken lines in FIG. 22 (*d*) according to the segment concatenation processing (S190 to S68 in FIG. 21), and solid lines indicate a processing result obtained after concatenating the speech segments indicated by the solid lines in FIG. 22 (*d*) according to the segment concatenation processing (S52 to S68 in FIG. 6). As shown in FIG. 22 (*e*), it becomes possible to extract the speech segment accurately using the weighted distributions Ve(i).

FIG. 23 is a diagram showing an experimental result in the case where a man utters the same sound as that shown in FIG. 22 in an environment in which the vacuum noise (SNR=40 dB) hardly appears. The graphs in FIG. 23 (*a*) to FIG. 23 (*e*) mean the same thing as the graphs in FIG. 22 (*a*) to FIG. 22 (*e*). When comparing, in FIG. 23, FIG. 23 (*d*) showing the speech segments before being concatenated and FIG. 23 (*e*) showing the speech segments after being concatenated, the result of S180 indicated by broken lines in FIG. 23 (*d*) shows that the speech segments are accurately concatenated in the same manner as indicated by solid lines in FIG. 23 (*e*). Therefore, when the estimated SNR is very high, it is possible to maintain a high performance for detecting speech segments according to the judgment processing of S190 in FIG. 21, even if the speech segments are determined without performing the processing of S52 to S58.

As described above, according to the present embodiment, it becomes possible to extract the sounds belonging to the above Group B by evaluating transition segments between voiced sounds and unvoiced sounds using the weighted distributions Ve. As a result, it becomes possible to extract speech segments accurately without concatenating the segments, in the case where it is judged using an estimated SNR that the SNR is high. In addition, it becomes possible to reduce mis-detections of a noise segment as a speech segment because the predetermined number of frames to be concatenated (S54 in FIG. 21) can be decreased even if SNR is low and the segments need to be concatenated.

Figure 24:
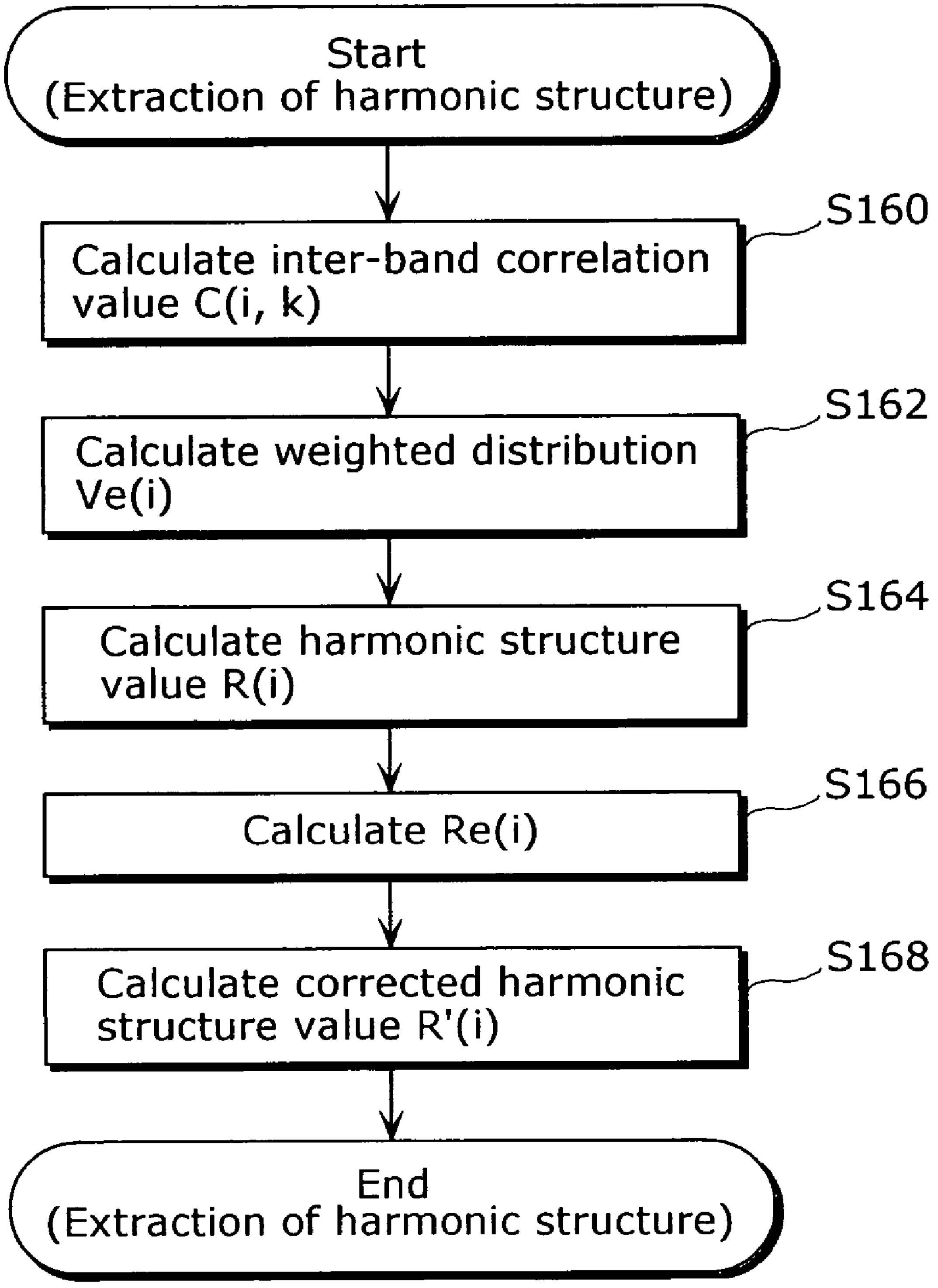
FIG. 24 is a flowchart showing another example of the harmonic structure extraction processing.

Note that it is also possible to calculate corrected harmonic structure values R'(i) instead of harmonic structure values R(i) so as to detect a speech segment based on the weighted distributions Ve(i) and the corrected harmonic structure values R'(i). FIG. 24 is a flowchart showing another example of the harmonic structure extraction processing (S140 in FIG. 19).

The harmonic structure extraction unit 501 calculates an inter-band correlation value C(i, k), a weighted distribution Ve(i) and a harmonic structure value R(i) (S160 to S164). The method for calculating these is same as that shown in FIG. 20, and a detailed description thereof is not repeated here. Next, the harmonic structure extraction unit 501 calculates the weighted harmonic structure value Re(i) (S160). The weighted harmonic structure value Re(i) is calculated according to the following equations. These equations are different from the equations used for the calculation in S96/S98 in that the harmonic structure value R(i) of the frame i calculated in S94 is used in the former equations, while the band number N(i) thereof is used in the latter equations. Both of these equations are corrected by weighted distribution so as to be the indices for accentuating the harmonic structure.

$$Rd(i) = \underset{k=i-Xc:i}{\text{median}}(R(k)) - \underset{k=i-Xc:i}{\text{var}}(R(k)); \quad (20)$$

$$Re(i) = \max_{k=i:i+Xc}(Rd(k)); \quad (21)$$

Xc: Frame width for calculation of distribution (=5) where the function median( ) indicates the median value in the parentheses.

The harmonic structure extraction unit 501 calculates the corrected harmonic structure value R'(i) (S168). The corrected harmonic structure value R'(i) is calculated according to the following equations.

$$R'(i)=Re(i);: \text{if } Re(i)>0; \quad (22)$$

$$R'(i)=0;: \text{if } Re(i)<0; \quad (23)$$

Figure 25:
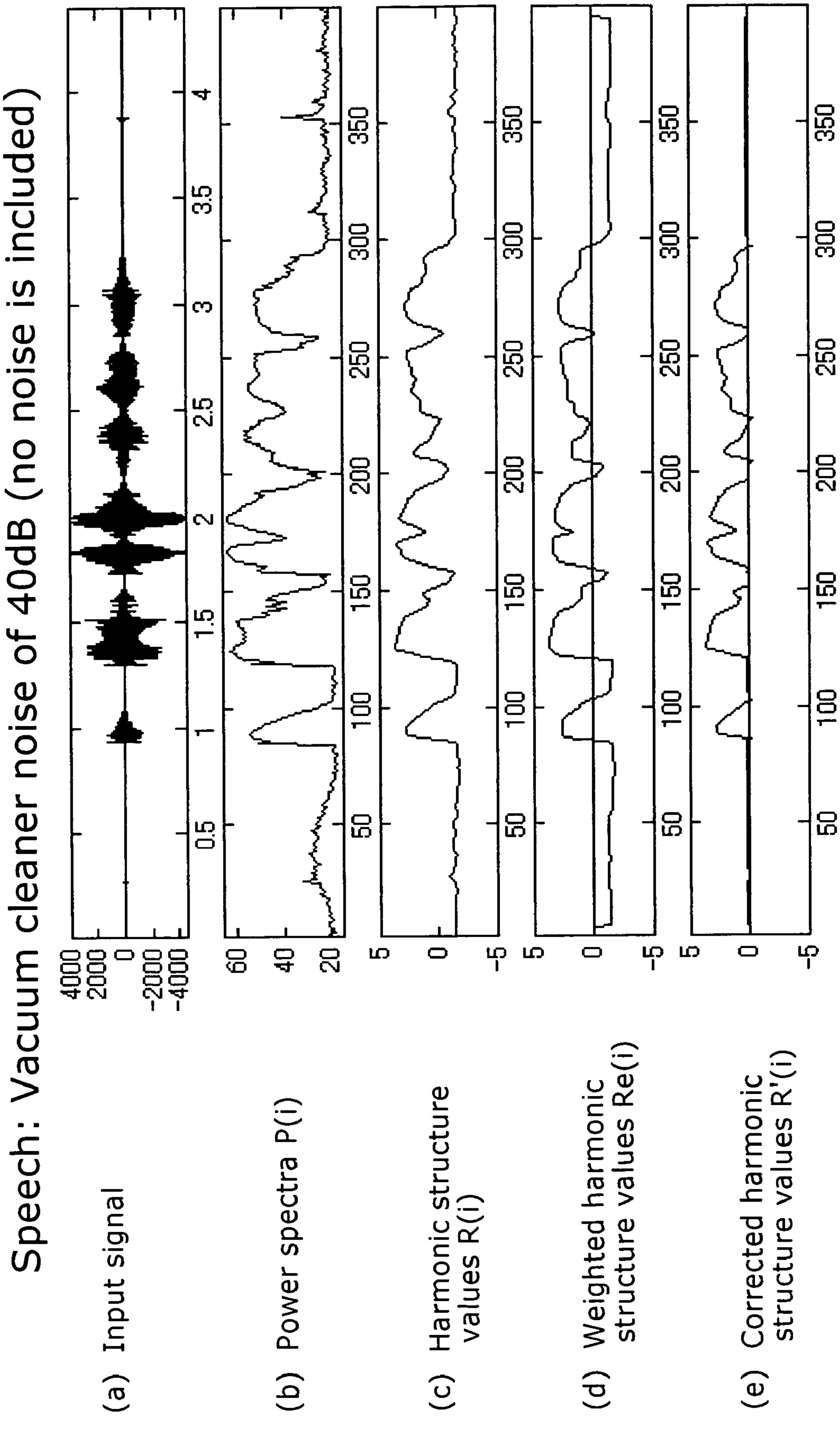
FIG. 25 (*a*) is a diagram showing an input signal.
Figure 26:
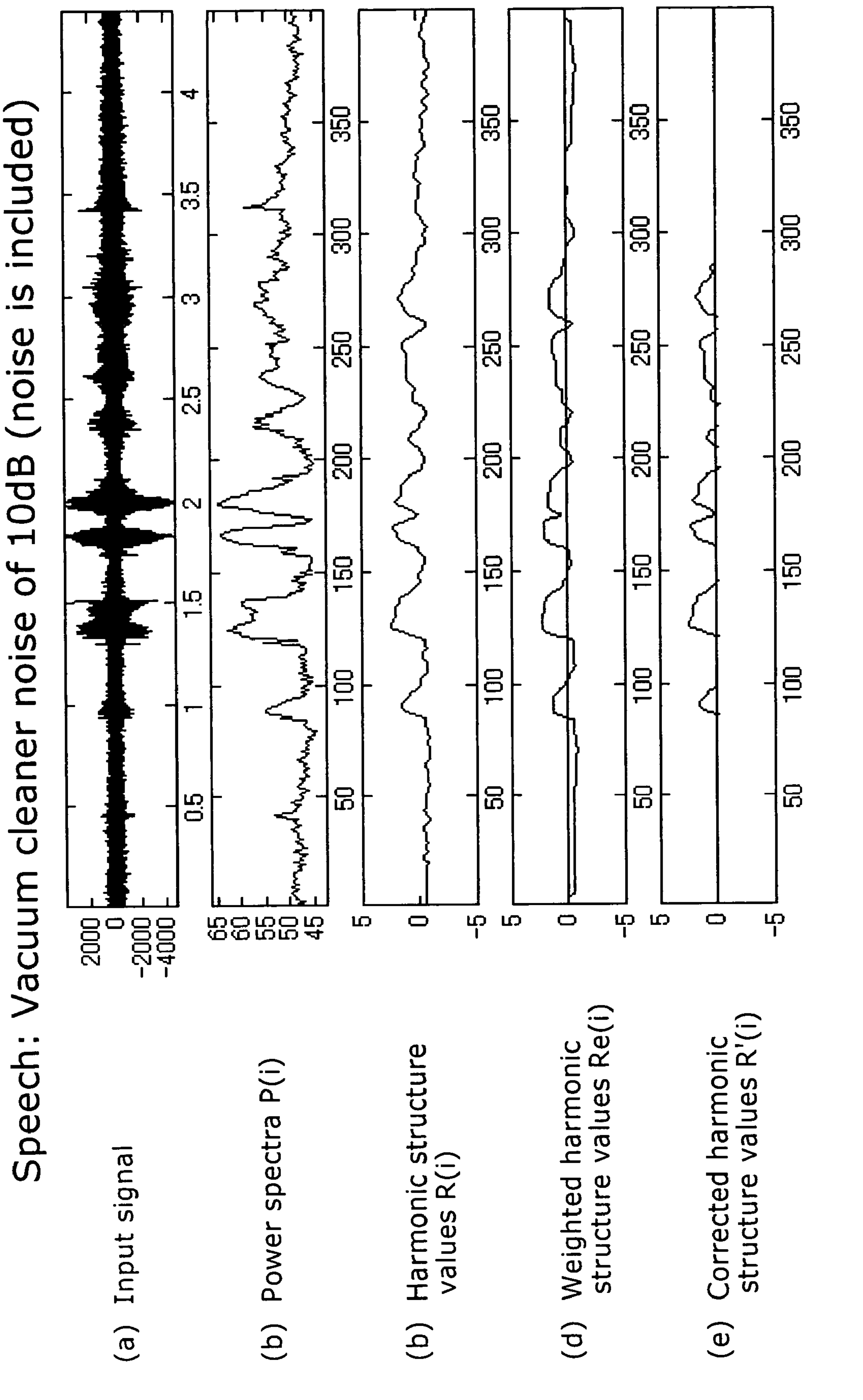
FIG. 26 (*a*) is a diagram showing an input signal.

FIG. 25 and FIG. 26 are diagrams showing the result of the processing executed according to the flowchart shown in FIG. 24. FIG. 25 shows an experimental result in the case where a man utters a sound in an environment in which there is no noise of a vacuum cleaner (SNR=40 dB), while FIG. 26 shows an experimental result in the case where the man utters the sound in an environment in which the vacuum noise (SNR=10 dB) appears. It is assumed that in this experiment, the man utters the same sound as that shown in FIG. 23 and the sudden sound and periodic noise also appear at the same timings as those in FIG. 23.

FIG. 25 (*a*) shows an input signal, FIG. 25 (*b*) shows power spectra of the input signal, FIG. 25 (*c*) shows harmonic structure values R(i), FIG. 25 (*d*) shows weighted harmonic structure values Re(i), and FIG. 25 (*e*) shows corrected harmonic structure values R'(i). FIG. 26 (*a*) to FIG. 26 (*e*) also show the similar graphs to those shown in FIG. 25 (*a*) to FIG. 25 (*e*).

The corrected harmonic structure values R'(i) are calculated based on the distribution of the harmonic structure values R(i) themselves. Therefore, it becomes possible to properly extract a part with a harmonic structure using the property that there appears a wider distribution in the part with a harmonic structure while there appears a narrower distribution in the part without a harmonic structure.

Fifth Embodiment

Each of the speech segment detection devices according to the above-mentioned first through fourth embodiments determines a speech segment in an input signal of speech which is previously recorded in a file or the like. This type of processing method is effective when, for example, the processing is performed on already recorded data, but unsuitable for determining a segment during reception of speech. Therefore, in the present embodiment, a description is given of a speech segment detection device which determines a speech segment in synchronism with reception of speech.

Figure 27:
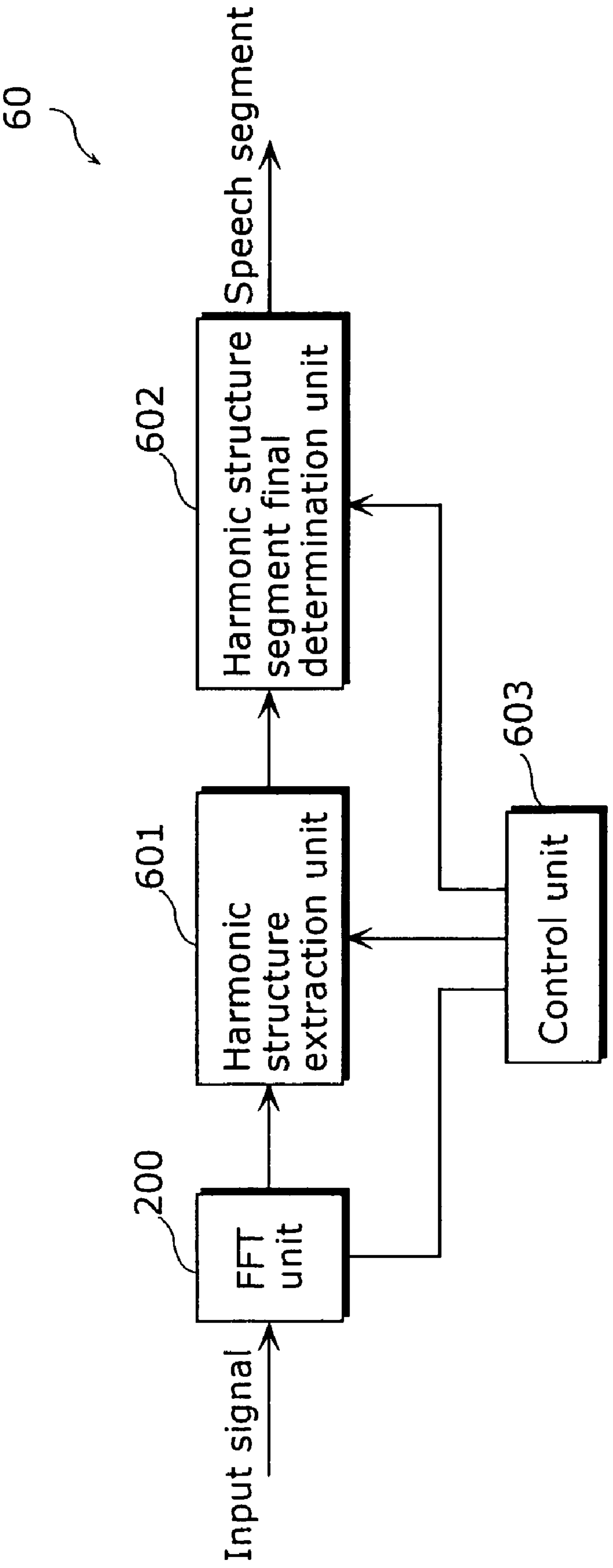
FIG. 27 is a block diagram showing a structure of a speech segment detection device according to a fifth embodiment.

FIG. 27 is a block diagram showing a structure of a speech segment detection device 60 according to the present embodiment of the present invention. The speech segment detection device 60 is a device which detects a speech segment with a harmonic structure (harmonic structure segment) in an input signal, and includes the FFT unit 200, a harmonic structure extraction unit 601, a harmonic structure segment final determination unit 602 and a control unit 603.

Figure 28:
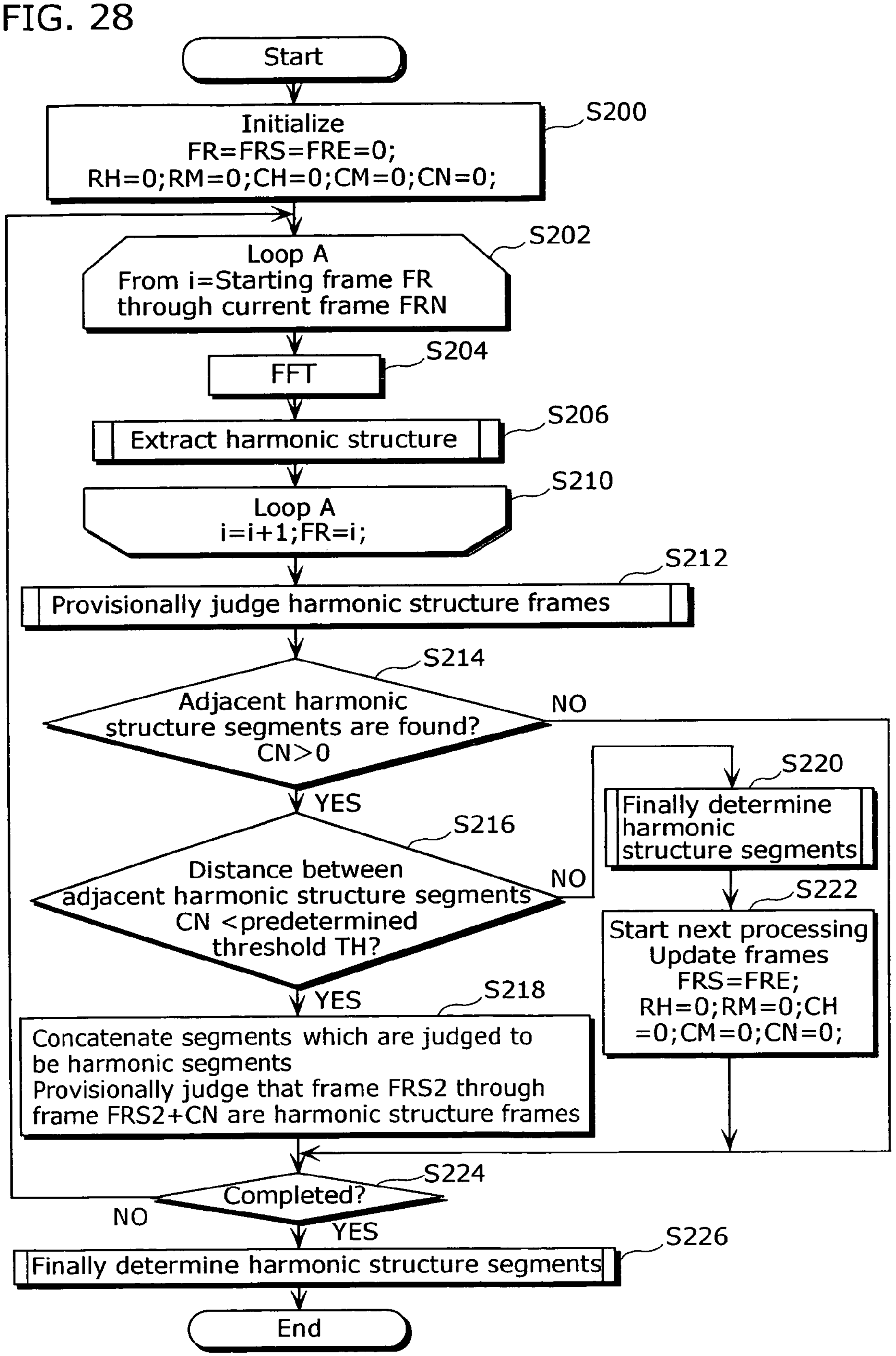
FIG. 28 is a flowchart of processing performed by the speech segment detection device.

FIG. 28 is a flowchart of processing performed by the speech segment detection device 60. The control unit 603 sets FR, FRS, FRE, RH, RM CH, CM and CN to be 0 (S200). Here, FR indicates the number of the first frame among the frames in which the harmonic structure values R(i) to be described later are not yet calculated. FRS indicates the number of the first frame in the segment which is not yet determined to be a harmonic structure segment or not. FRE indicates the number of the last frame on which the harmonic structure frame provisional judgment processing to be described later is performed. RH and RM indicate the accumulated values of the harmonic structure values. CH and CN are counters.

The FFT unit 200 performs FFT on an input frame. The harmonic structure extraction unit 601 extracts a harmonic structure value R(i) based on the power spectral components extracted by the FFT unit 200. The above processing is performed on all the frames from the starting frame FR through the frame FRN of the current time (Loop A in S202 to S210). Every time the loop is executed once, the counter i is incremented by one and the value of the counter i is substituted into the starting frame FR (S210).

Next, the harmonic structure segment final determination unit 602 performs the harmonic structure frame provisional judgment processing for provisionally judging a segment with a harmonic structure, based on the harmonic structure value R(i) obtained in the previous processing (S212). The harmonic structure frame provisional judgment processing is described later.

Figure 29:
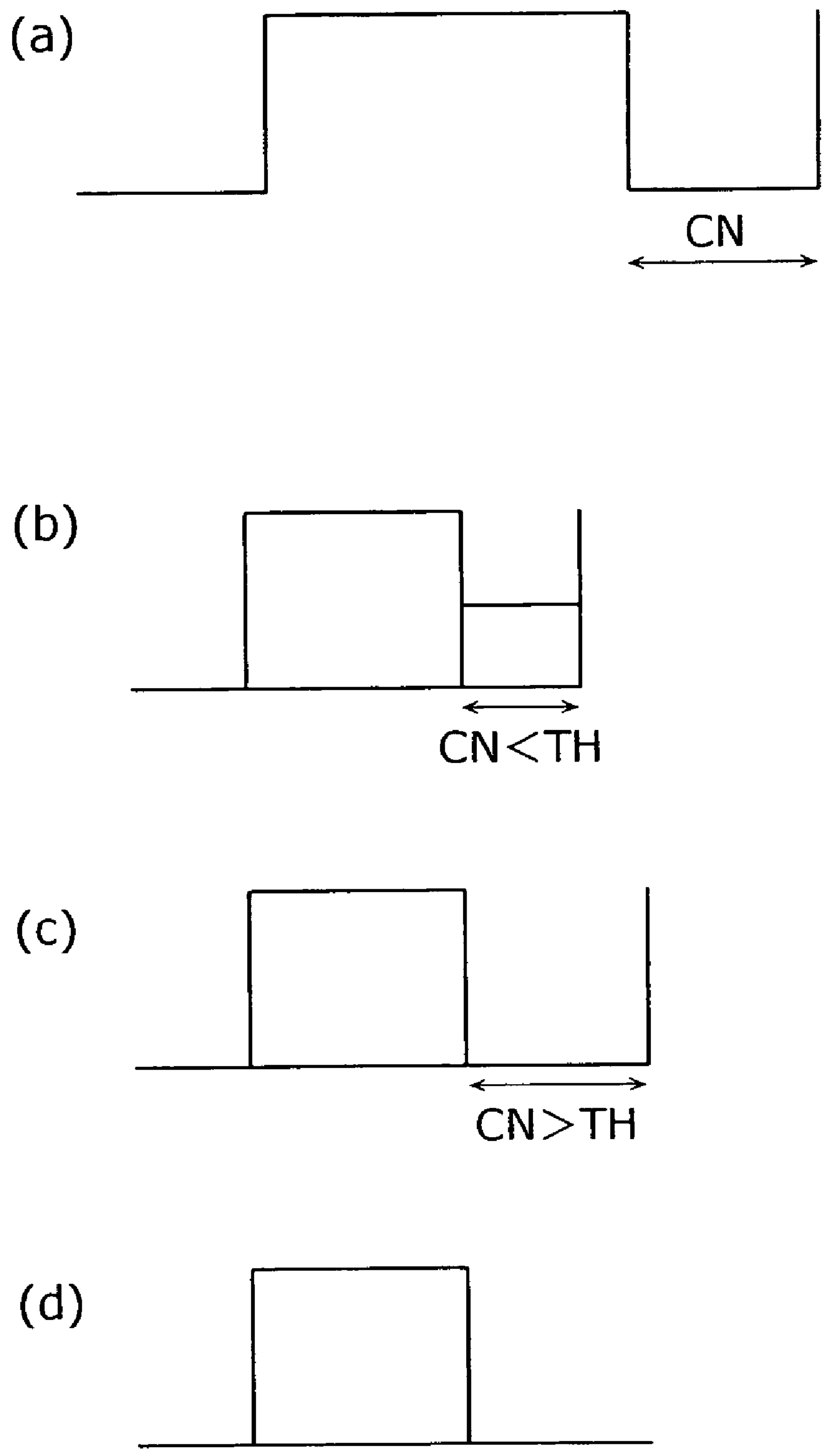
FIG. 29 (*a*) to (*d*) is a diagram for explaining concatenation of harmonic structure segments.

After the processing in S212, the harmonic structure segment final determination unit 602 checks whether adjacent harmonic structure segments are found or not, namely, whether or not the non-harmonic structure segment length CN is longer than 0 (S214). As shown in FIG. 29 (*a*), the non-harmonic structure segment length CN indicates the length of the frame between the last frame of a harmonic structure segment and the starting frame of the next harmonic structure segment.

In the case where adjacent harmonic structure segments are found, the harmonic structure segment final determination unit 602 checks whether or not the non-harmonic structure segment length CN is smaller than a predetermined threshold (S216). When the non-harmonic structure segment length CN is smaller than the predetermined threshold TH (YES in S216), the harmonic structure segment final determination unit 602 concatenates the harmonic structure segments as shown in FIG. 29 (*b*), and provisionally judges the frames from the frame FRS2 through the frame (FRS2+CN) to be harmonic structure segments (S218). Here, FRS2 indicates the number of the first frame of the frames which are provisionally judged to be harmonic structure segments.

In the case where the non-harmonic structure segment length CN is larger than the predetermined threshold TH (NO in S216), the harmonic structure segments are not concatenated as shown in FIG. 29 (*c*), and the harmonic structure segment final determination unit 602 performs the harmonic structure segment final determination processing to be described later on those segments (S220). After that, the control unit 603 substitutes FRE into FSR, and also substitutes 0 into RH, RM, CH and CM (S222). The harmonic structure segment final determination processing (S220) is described later.

In the case where the adjacent harmonic structure segments are not found (NO in S214 and FIG. 29 (*d*)), the control unit 603 judges whether the input of the audio signal has been completed or not (S224) after the processing of S218 or S222. If the input of the audio signal has not yet been completed (NO in S224), the processing of S202 and the following is repeated. If the input of the audio signal has been completed (YES in S224), the harmonic structure segment final determination unit 602 performs the harmonic structure segment final determination processing (S226) and ends the processing. The harmonic structure segment final determination processing (S226) is described later.

Figure 30:
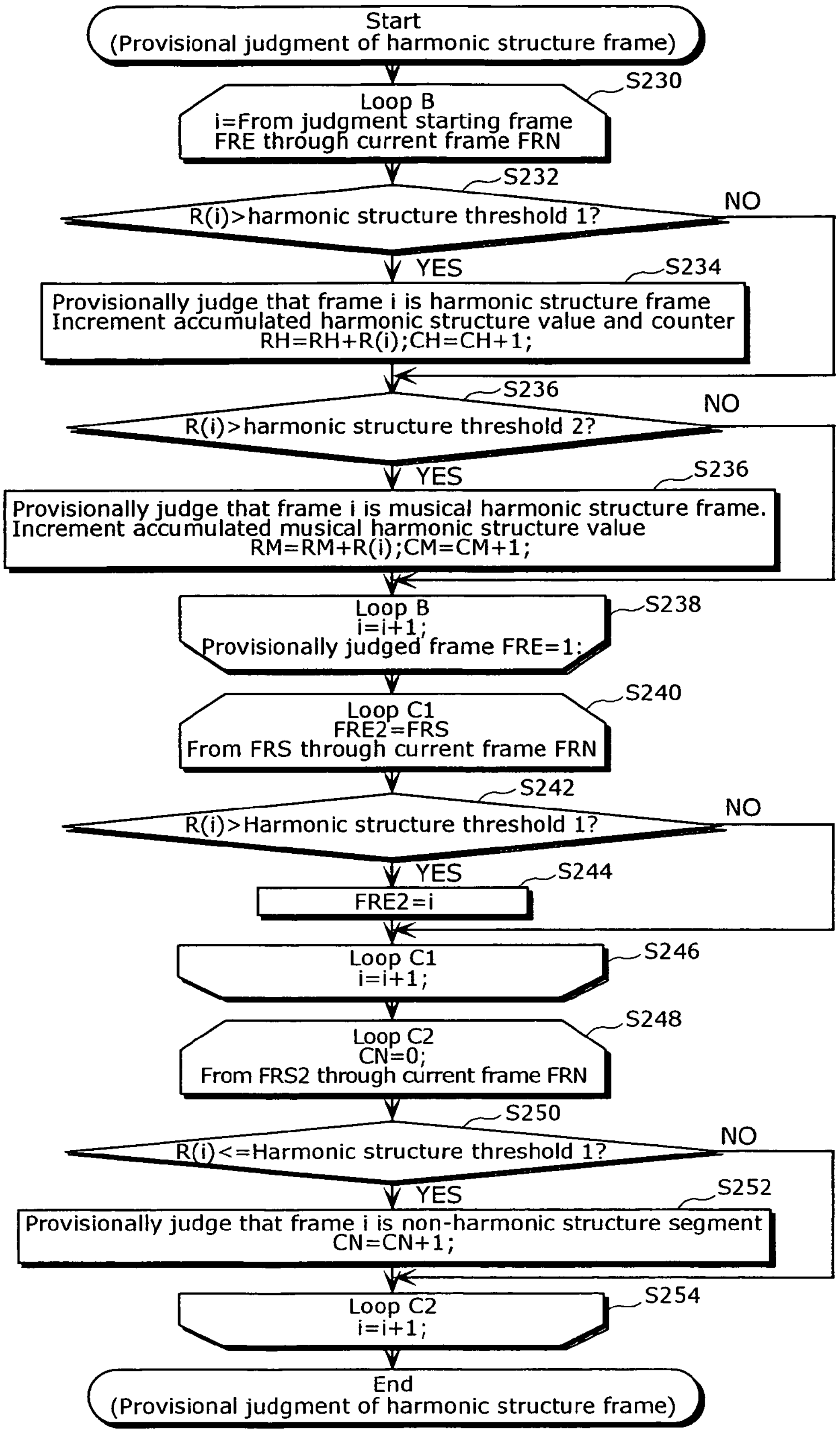
FIG. 30 is a detailed flowchart of harmonic structure frame provisional judgment processing.

Next, a description is given of the harmonic structure frame provisional judgment processing (S212 in FIG. 28). FIG. 30 is a detailed flowchart of the harmonic structure frame provisional judgment processing. The harmonic structure segment final determination unit 602 judges whether or not the harmonic structure value R(i) is larger than a predetermined harmonic structure threshold 1 (S232), and in the case where the value R(i) is larger (YES in S232), it provisionally judges that the current frame i is a frame with a harmonic structure. Then, it adds the harmonic structure value R(i) to the accumulated harmonic structure value RH, and increments the counter CH by one (S234).

Next, the harmonic structure segment final determination unit 602 judges whether or not the harmonic structure value R(i) is larger than the harmonic structure threshold 2 (S236), and in the case where the value R(i) is larger (YES in S236), it provisionally judges that the current frame i is a music frame with a harmonic structure. Then, it adds the harmonic structure value R(i) to the accumulated musical harmonic structure value RM, and increments the counter CM by one (S236). The above processing is repeated for the frame FRE through the frame FRN (S230 to S238).

Next, after judging the frame FRS2 to be the frame FRS, the harmonic structure segment final determination unit 602 judges whether or not the harmonic structure value R(i) of the current frame i is larger than the harmonic structure threshold 1 (S242), and in the case where the value R(i) is larger, it judges that the frame FRS2 is the frame i (S244). The above processing is repeated for the frame FRS through the frame FRN (S240 to S246).

Next, after setting the counter CN to be 0, the harmonic structure segment final determination unit 602 judges whether or not the harmonic structure value R(i) of the current frame i is equal to or smaller than the harmonic structure threshold 1 (S250), and in the case where the value R(i) is equal to or smaller than the harmonic structure threshold 1 (YES in S250), it provisionally judges that the frame i is a non-harmonic structure segment and increments the counter CN by one (S252). The above processing is repeated for the frame FRS2 through the frame FRN (S248 to S254). According to the above processing, segments with harmonic structures, segments with musical harmonic structures and non-harmonic structure segments are provisionally determined.

Figure 31:
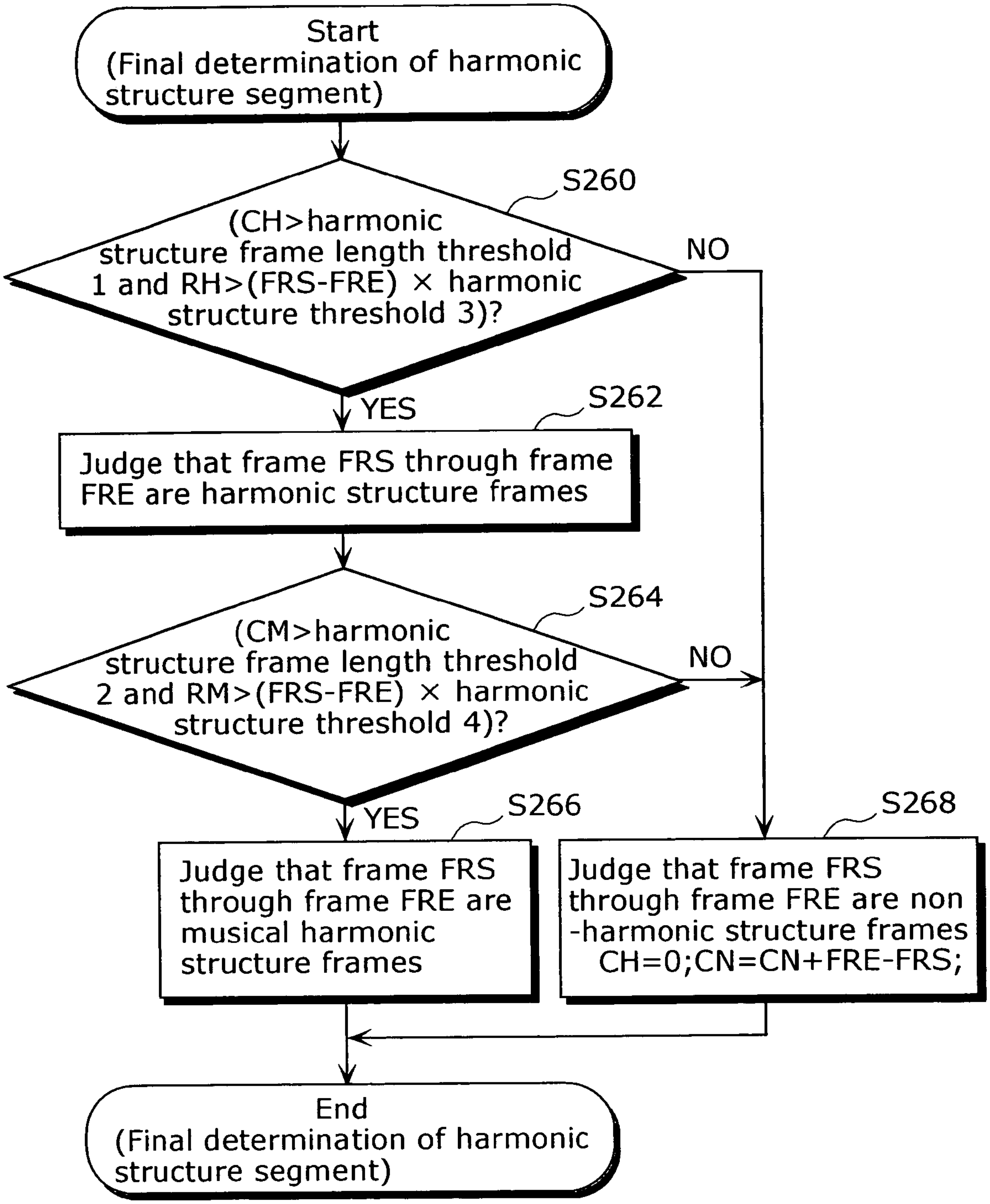
FIG. 31 is a detailed flowchart of harmonic structure segment final determination processing.
Figure 32:
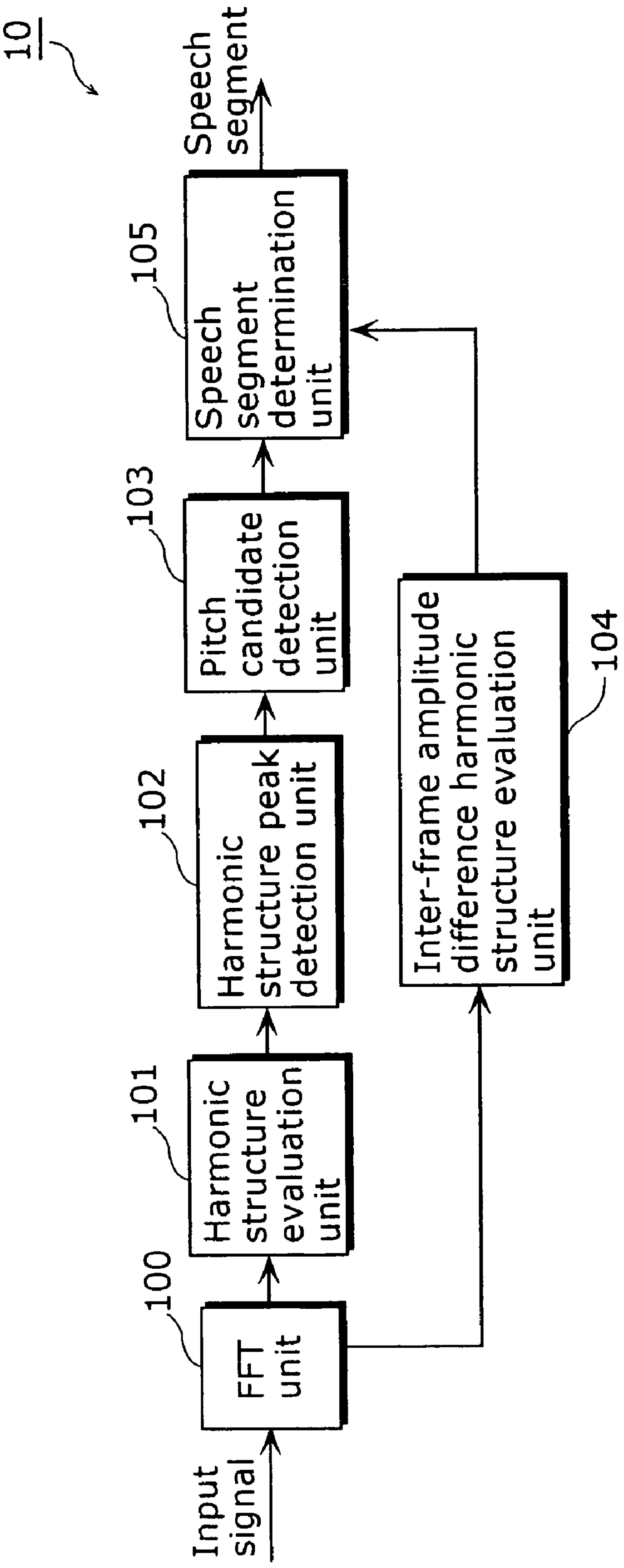
FIG. 32 is a diagram showing a rough hardware structure of a conventional speech segment determination device.

Next, a detailed description of the harmonic structure segment final determination processing (S220 and S226 in FIG. 28) is given. FIG. 31 is a detailed flowchart of the harmonic structure segment final determination processing (S220 and S226 in FIG. 28).

The harmonic structure segment final determination unit 602 judges whether or not the value of the counter CH indicating the number of frames with harmonic structures is larger than the harmonic structure frame length threshold 1, and whether or not the accumulated harmonic structure value RH is larger than (FRS−FRE)×harmonic structure threshold 3 (S260). In the case where the above conditions are satisfied (YES in S260), the harmonic structure segment final determination unit 602 judges that the frame FRS through the frame FRE are harmonic structure frames (S262).

The harmonic structure segment final determination unit 602 judges whether or not the value of the counter CM indicating the number of frames with harmonic structures is larger than the harmonic structure frame length threshold 2, and whether or not the accumulated musical harmonic structure value RH is larger than (FRS−FRE)×harmonic structure threshold 4 (S264). In the case where the above conditions are satisfied (YES in S264), the harmonic structure segment final determination unit 602 judges that the frame FRS through the frame FRE are musical harmonic structure frames (S266).

In the case where the above conditions are not satisfied (NO in S260) or in the case of NO in S264, it can be judged that the frame is a frame without a musical harmonic structure but with a harmonic structure. Therefore, the harmonic structure segment final determination unit 602 judges that the frame FRS through the frame FRE are non-harmonic structure frames, and substitutes 0 into the counter CH and CN+FRE−FRS into the counter CN (S268).

Flexible selection of the harmonic structure judgment method becomes possible, from among, for example, the use of the harmonic structure provisional judgment in the case of frame-wise judgment, the use of the result of the harmonic structure segment determination in the case of more accurate judgment, and the use of both methods by switching them according to the situations.

By performing the above-mentioned processing, it becomes possible to determine harmonic structure frames, musical harmonic structure frames and non-harmonic structure frames.

As described above, according to the present embodiment, it is possible to judge in real time whether or not an input audio signal has a harmonic structure. Therefore, it becomes possible to eliminate non-harmonic noise, in a mobile phone or the like, with delay of a predetermined number of frames. Also, since the present embodiment allows distinction between speech and music, it becomes possible, in a communication using a mobile phone or the like, to code a speech part and a music part by different methods.

According to the above-described embodiments, it is possible to determine speech segments accurately, not depending on the fluctuation of the input signal level, even if the voice is produced with environmental noise. It is also possible to detect speech segments accurately by removing the influence of a sudden noise or a periodic noise. Furthermore, it is possible to detect speech segments in real time. In addition, it is possible to accurately detect, as speech segments, consonant parts that show unclear harmonic structures. It is also possible to remove spectral envelope components by performing low-cut filtering on the spectral components obtained by frequency-converting an input signal.

The speech segment detection device according to the present invention has been described based on the first through fifth embodiments, but the present invention is not limited to these embodiments.

(Modification of FFT Unit 200)

For example, in the above embodiments, a method using FFT power spectral components as acoustic features has been described, but it is also possible to use the FFT spectral components themselves, a per-frame autocorrelation function and FFT power spectral components of a linear prediction residual in the time domain. Or, it is also possible to accentuate a harmonic structure by widening the difference between the maximum value and the minimum value of the power spectral components, using the method of multiplying each spectral component by itself, before obtaining FFT power spectra from FFT spectra. Furthermore, it is possible to obtain an FFT power spectrum by calculating the square root of an FFT spectrum, instead of obtaining an FFT power spectrum by calculating the logarithm of an FFT spectrum. Also, it is possible to multiply each frame of time domain data by a coefficient such as the Hamming window before obtaining FFT spectral components, or to accentuate the higher frequency part by performing pre-accentuation processing (1−z−1). Or, it is possible to use linear spectral frequencies (LSF) as acoustic features. In addition, frequency transform operation is not limited to FFT, and discrete Fourier transform (DFT), discrete cosine transform (DCT) or discrete sine transform (DST) may be used.

(Modification of Harmonic Structure Extraction Unit 201)

Instead of the processing performed by the harmonic structure extraction unit 201 for removing a floor component included in a spectral component S(f) (S26 in FIG. 3), it is possible to perform low-cut filtering on the spectral component S(f). Considering the spectral component S(f) of each frame as a waveform in the frequency domain, a spectral envelope component fluctuates slower than a harmonic structure. Therefore, by performing low-cut filtering on the spectral component, the spectral envelope component can be removed. This method is equivalent to removal of a low frequency component using a low-cut filter in the time domain, but it can be said that the method of filtering in the frequency domain is more desirable in that it is possible to evaluate the harmonic structure and the information such as frequency band power and spectral envelope at the same time. However, the spectral component calculated using such a low-cut filter could include not only a speech sound of frequency fluctuations caused by harmonic structures but also a non-periodic noise and a non-speech sound of a single frequency such as an electronic sound. But these sounds can be removed by the processing by the voiced feature evaluation unit 210 and the speech segment determination unit 205.

As another method for removing a floor component, there is a method not using spectral components of a predetermined reference value or less among spectral components. The method for calculating the reference value includes: a method using, as a reference value, the average value of the spectral components of all the frames; a method using, as a reference value, the average value of the spectral components in a time duration which is longer enough than the duration of a single utterance (for example, five seconds); and a method of previously dividing the spectral component into several frequency bands and using, as a reference value, the average value of the spectral components of each frequency band. Particularly in the case where the environment changes, for example, a quiet environment changes to a noisy one, it is more desirable to use the average value of spectral components in a segment of a few seconds including a current frame to be detected than to use the average value of spectral components of all the frames.

(Modification of Inter-frame Feature Correlation Value Calculation Unit 203)

The inter-frame feature correlation value calculation unit 203 may calculate a correlation value E1(*j*) using the following equation (24), as a correlation function, instead of the equation (3). Here, equation (24) indicates the cosine of the angle formed by two vectors P(i−1) and P(i), where P(i−1) and P(i) are vectors in a 128-dimensional vector space. The inter-frame feature correlation value calculation unit 203 may calculate a correlation value E2(*j*), instead of the correlation value E1(*j*), according to the following equations (25) and (26), using the inter-frame correlation value between the frame j and a frame 4 frames away from the frame j, or may calculate a correlation value E3(*j*) according to the following equations (27) and (28), using the inter-frame correlation value between the frame j and a frame 8 frames away from the frame j. As mentioned above, this modification is characterized in that a correlation value which is immune to a sudden environmental noise can be obtained by calculating a correlation value between frames far away from each other.

Furthermore, it is possible to calculate a correlation value E4(*j*) depending on the sizes of the correlation value E1(*j*), the correlation value E2(*j*) and the correlation value E3(*j*), according to the following equations (29) to (31), or to calculate a correlation value E5(*j*) that is the result of the addition of the correlation value E1(*j*), the correlation value E2(*j*) and the correlation value E3(*j*), according to the following equation (32), or to calculate a correlation value E6(*j*) that is the maximum value among the correlation value E1(*j*), the correlation value E2(*j*) and the correlation value E3(*j*), according to the following equation (33).

$$xcorr(P(i-1), P(i)) = \frac{P(i-1)\cdot P(i)}{|P(i-1)||P(i)|} = \frac{p1(j-1)\times p1(j) + p2(j-1)\times p2(j) + \ldots + (p128(j-1)\times p128(j)}{\sqrt{p1(j-1)^2 + p2(j-1)^2 + \ldots + p128(j-1)^2}\sqrt{p1(j)^2 + p2(j)^2 + \ldots + p128(j)^2}} \tag{24}$$

$$z2(i) = \max(xcorr(P(i-4), P(i))) \tag{25}$$

$$E2(j) = \sum_{i=j-2}^{j} z2(i) \tag{26}$$

$$z3(i) = \max(xcorr(P(i-8), P(i))) \tag{27}$$

$$E3(j) = \sum_{i=j-2}^{j} z3(i) \tag{28}$$

-continued $$E4(j) = z1(i) \tag{29}$$

$$\text{if } (z3(j) > 0.5)\ E4(j) = E4(j) + z1(j)/z3(j) \tag{30}$$

$$\text{if } (z2(j) > 0.5)\ E4(j) = E4(j) + z1(j)/z2(j) \tag{31}$$

$$\begin{aligned} E5(j) &= E1(j) + E2(j) + E3(j) \\ &= \sum_{i=j-2}^{j} z1(i) + \sum_{i=j-2}^{j} z2(i) + \sum_{i=j-2}^{j} z3(i) \end{aligned} \tag{32}$$

$$\begin{aligned} E6(j) &= \max(E1(j), E2(j), E3(j)) \\ &= \max\left(\sum_{i=j-2}^{j} z1(i), \sum_{i=j-2}^{j} z2(i), \sum_{i=j-2}^{j} z3(i)\right) \end{aligned} \tag{33}$$

Note that the correlation values are not limited to the above six values E1(*j*) to E6(*j*), and a new correlation value may be calculated by combining these correlation values. For example, it is also possible to use, based on the SNR of a previously estimated input acoustic signal, the correlation value E1(*j*) when the SNR is low, while the correlation value E2(*j*) or E3(*j*) when the SNR is high.

(Modification of Speech Segment Determination Unit 205)

The processing of the speech segment determination unit 205 which has been described with reference to FIG. 6 is roughly classified into the following three processes: the process for determining a voiced segment using a correlation value (S42 to S50); the process for concatenating voiced segments (S52 to S58); and the process for determining a speech segment based on the duration of the voiced segment (S60 to S68). However, these three processes do not need to be executed in the order as shown in FIG. 6, and they may be executed in another order. Only one or two of these three processes may be executed. FIG. 6 shows the example where the processing is performed on a single utterance basis, but a speech segment may be determined and corrected per frame, for example, by performing only the process for determining the voiced segment using the correlation value per current frame. It is also possible, assuming that real-time detection is requested, to output the speech segment determined using the correlation value per frame, as a preliminary value, and separately output, on a regular basis, the speech segment corrected and determined on a longer segment basis such as a single utterance basis, as a determined value, so that the present invention is implemented as a speech detector which can meet both the requirements for real-time detection and high detected segment performance.

(Modification of SNR Estimation Unit 206)

The SNR estimation unit 206 may estimate SNR directly from an input signal. For example, the SNR estimation unit 206 obtains, from the corrected correlation values calculated by the difference processing unit 204, the power of the S (signal) part including positive corrected correlation values and the power of the N (noise) part including negative corrected correlation values, so as to obtain the SNR.

OTHER MODIFICATIONS

Furthermore, it is possible to use the speech segment detection device as a speech recognition device for speech recognition of only speech segments after the above speech segment detection processing is performed as preprocessing.

It is also possible to use the speech segment detection device as a speech recording device such as an integrated circuit (IC) recorder for recording only speech segments after the above speech segment detection processing is performed as preprocessing. As described above, by recording only the speech segments, it becomes possible to use a storage area of the IC recorder efficiently. It also becomes possible to extract only the speech segments for efficient reproduction thereof using a speech rate conversion function.

It is also possible to use the speech recognition device as a noise reduction device which removes other parts than speech segments of an input signal so as to suppress noise.

It is further possible to use the above speech segment detection processing for extracting a video part of speech segments from the video shot by a video tape recorder (VTR) or the like, and this processing is applicable to an authoring tool or the like for editing video.

It is also possible to extract one or more frequency bands, among the power spectral components S'(f) shown in FIG. 4(*f*), in which harmonic structures are maintained in the best manner, and perform the processing using only these extracted bands.

It is also possible to learn noise features in non-speech segments by detecting such segments so as to determine filtering coefficients for noise removal, parameters for noise determination and the like. By doing so, a device for removing noise can be created.

In addition, combinations of various harmonic structure values or correlation values and various speech segment determination methods are not limited to the above-mentioned embodiments.

INDUSTRIAL APPLICABILITY

Since the speech segment detection device according to the present invention allows accurate distinction between speech segments and noise segments, they are useful as a preprocessing device for a speech recognition device, an IC recorder which records only speech segments, a communication device which codes speech segments and music segments by different coding methods, and the like.

The invention claimed is:

1. A harmonic structure acoustic signal detection method for detecting a segment that includes speech, as a speech segment, from an input acoustic signal which is divided into a plurality of frames with a predetermined period, said harmonic structure acoustic signal detection method comprising:

an acoustic feature extraction step of extracting an acoustic feature using a processor in each frame of the plurality of frames into which the input acoustic signal is divided; and a segment determination step of evaluating a continuity of the extracted acoustic features and of determining a speech segment according to the evaluated continuity, wherein said acoustic feature extraction step includes:

a frequency transformation step of frequency-transforming each frame of the plurality of frames to obtain components;

a correlation value calculation step of dividing the components obtained through said frequency transformation step into frequency bands of a predetermined bandwidth and calculating correlation a value between components in predetermined frequency bands in different frames;

a weight calculation step of calculating a weight, in a same frame or between adjacent frames, the calculated weight, when a difference between a maximum value of correlation values and a minimum value of the correlation values is larger than a threshold value, being smaller than the calculated weight when the difference between the maximum value of the correlation values and the minimum value of the correlation values is smaller than the threshold; and a harmonic structure acoustic feature extraction step of extracting the acoustic feature that is a value of a harmonic structure represented by a number, using a product of the correlation value calculated in said correlation value calculating step and the weight calculated in said weight calculation step, and wherein, in said segment determination step, the speech segment is determined based on at least one of a correlation value between acoustic features in the same frame and a correlation value between acoustic features in different frames.

2. The harmonic structure acoustic signal detection method according to claim 1, wherein, in said segment determination step, the continuity of the acoustic features is evaluated based on a correlation value between the acoustic features of different frames.

3. The harmonic structure acoustic signal detection method according to claim 1, wherein, in said segment determination step, the continuity of the acoustic features is evaluated based on distributions of the acoustic features in different frames.

4. The harmonic structure acoustic signal detection method according to claim 1, further comprising:

an evaluation step of calculating an evaluation value for evaluating the continuity of the acoustic features, wherein, in said segment determination step, the continuity evaluated is a temporal continuity.

5. The harmonic structure acoustic signal detection method according to claim 4, wherein said segment determination step further includes:

a step of estimating a speech signal-to-noise ratio of the input acoustic signal to be high if, for a predetermined number of frames, acoustic features extracted in said acoustic feature extraction step or the evaluation values calculated in said evaluation step are greater in magnitude than a first predetermined threshold, wherein the speech segment is determined based on the evaluation value calculated in said evaluation step, in the case where the estimated speech signal-to-noise ratio is estimated to be high, and wherein the speech segment is determined based on an evaluated temporal continuity of the evaluation values, in the case where the speech signal-to-noise ratio is not estimated to be high.

6. The harmonic structure acoustic signal detection method according to claim 1, wherein said segment determination step includes:

an evaluation step of calculating an evaluation value for evaluating the continuity of the acoustic features; and a non-speech harmonic structure segment determination step of evaluating temporal continuity of the evaluation values and determining, according to the evaluated temporal continuity, a non-speech harmonic structure segment that has a harmonic structure but is not a speech segment.

7. The harmonic structure acoustic signal detection method according to claim 1, wherein said weight calculation step includes:

a band number calculation step of calculating a band number which indicates a difference between an identifier of a frequency band having a maximum value and an identifier of a frequency band having a minimum value in the correlation value in a same frame or between adjacent frames;

a corrected band number calculation step of calculating, based on a distribution of band numbers, corrected band numbers of the band numbers; and a weighted band number calculating step of calculating a weighted band number as the weight, the weighted band number being a maximum value of the corrected band numbers.

8. The harmonic structure acoustic signal detection method according to claim 1, wherein, in said segment determination step, the continuity is evaluated based on correlation values between two or more types of frames of different time periods.

9. The harmonic structure acoustic signal detection method according to claim 8, wherein, in said segment determination step, one of the correlation values between the two or more types of frames of different time periods is selected based on a speech signal-to-noise ratio of the input acoustic signal, and the continuity is evaluated based on the selected correlation value.

10. The harmonic structure acoustic signal detection method according to claim 1, wherein, in said segment determination step, the continuity is evaluated based on a corrected correlation value calculated using a difference between (i) a correlation value between the acoustic features of frames and (ii) an average value of the correlation values of a predetermined number of frames.

11. A harmonic structure acoustic signal detection device for detecting a segment that includes speech, as a speech segment, from an input acoustic signal which is divided into a plurality of frames with a predetermined period, said harmonic structure acoustic signal detection device comprising:

an acoustic feature extraction unit operable to extract an acoustic feature using a processor in each frame of the plurality of frames into which the input acoustic signal is divided; and a segment determination unit operable to evaluate a continuity of the extracted acoustic features, and to determine a speech segment according to the evaluated continuity, wherein said acoustic feature extraction unit includes:

a frequency transformation unit operable to frequency-transform each frame of the plurality of frames to obtain components;

a correlation value calculation unit operable to divide the components obtained through said frequency transformation unit into frequency bands of a predetermined bandwidth and to calculate a correlation value between components in predetermined frequency bands in different frames;

a weight calculation unit operable to calculate a weight, in a same frame or between adjacent frames, the calculated weight when a difference between a maximum value of correlation values and a minimum value of the correlation values is larger than a threshold value, being smaller than the calculated weight when the difference between the maximum value of the correlation values and the minimum value of the correlation values is smaller than the threshold; and a harmonic structure acoustic feature extraction unit operable to extract the acoustic feature that is a value of a harmonic structure represented by a number, using a product of the correlation value calculated in said correlation value calculating unit and the weights calculated in said weight calculation unit, and wherein said segment determination unit is operable to determine the speech segment based on at least one of a correlation value between acoustic features in the same frame and a correlation value between acoustic features in different frames.

12. A speech recognition device for recognizing speech included in an input acoustic signal which is divided into a plurality of frames with a predetermined period, said speech recognition device comprising:

an acoustic feature extraction unit operable to frequency-transform using a processor each frame of the plurality of frames into which the input acoustic signal is divided and to extract an acoustic feature that is a value of a harmonic structure represented by a number;

a segment determination unit operable to evaluate a continuity of the extracted acoustic features, and to determine a speech segment according to the evaluated continuity; and a recognition unit operable to recognize speech in the speech segment determined by said segment determination unit, wherein said acoustic feature extraction unit includes:

a frequency transformation unit operable to frequency-transform each frame of the plurality of frames to obtain components;

a correlation value calculation unit operable to divide the components obtained through said frequency transformation unit into frequency bands of a predetermined bandwidth and to calculate a correlation value between components in predetermined frequency bands in different frames;

a weight calculation unit operable to calculate a weight in a same frame or between adjacent frames, the calculated weight, when a difference between a maximum value of correlation values and a minimum value of the correlation values is larger than a threshold value, being smaller than the calculated weight when the difference between the maximum value of the correlation values and the minimum value of the correlation values is smaller than the threshold; and a harmonic structure acoustic feature extraction unit operable to extract the acoustic feature that is a value of a harmonic structure represented by a number, using a product of the correlation value calculated in said correlation value calculating unit and the weight calculated in said weight calculation step, and wherein said segment determination unit is operable to determine the speech segment based on at least one of a correlation value between acoustic features in the same frame and a correlation value between acoustic features in different frames.

13. A speech recording device for recording speech included in an input acoustic signal which is divided into a plurality of frames with a predetermined period, said speech recording device comprising:

an acoustic feature extraction unit operable to frequency-transform using a processor each frame of the plurality of frames into which the input acoustic signal is divided and to extract an acoustic feature that is a value of a harmonic structure represented by a number;

a segment determination unit operable to evaluate a continuity of the extracted acoustic features, and to determine a speech segment according to the evaluated continuity; and a recording unit operable to record the input acoustic signal in the speech segment determined by said segment determination unit, wherein said acoustic feature extraction unit includes:

a frequency transformation unit operable to frequency-transform each frame of the plurality of frames to obtain components;

a correlation value calculation unit operable to divide the components obtained through said frequency transformation unit into frequency bands of a predetermined bandwidth and to calculate a correlation value between components in predetermined frequency bands in different frames;

a weight calculation unit operable to calculate a weight in a same frame or between adjacent frames, the calculated weight, when a difference between a maximum value of correlation values and a minimum value of the correlation values is larger than a threshold value, being smaller than the calculated weight when the difference between the maximum value of the correlation values and the minimum value of the correlation values is smaller than the threshold; and a harmonic structure acoustic feature extraction unit operable to extract the acoustic feature that is a value of a harmonic structure represented by a number, using a product of the correlation value calculated in said correlation value calculating unit and the weight calculated in said weight calculation unit, and wherein said segment determination unit is operable to determine the speech segment based on at least one of a correlation value between acoustic features in the same frame and a correlation value between acoustic features in different frames.

14. A computer-readable recording medium storing a computer program for causing a computer to execute:

an acoustic feature extraction step of frequency-transforming each frame of the plurality of frames into which the input acoustic signal is divided and extracting an acoustic feature that is a value of a harmonic structure represented by a number; and a segment determination step of evaluating a continuity of the extracted acoustic features and of determining a speech segment according to the evaluated continuity, wherein said acoustic feature extraction step includes:

a frequency transformation step of frequency-transforming each frame of the plurality of frames to obtain components;

a correlation value calculation step of dividing the components obtained through said frequency transformation step into frequency bands of a predetermined bandwidth and calculating a correlation value between components in predetermined frequency bands in different frames;

a weight calculation step of calculating a weight, in a same frame or between adjacent frames, the calculated weight when a difference between a maximum value of correlation values and a minimum value of the correlation values is larger than a threshold value, being smaller than the calculated weight when the difference between the maximum value of the correlation values and the minimum value of the correlation values is smaller than the threshold; and a harmonic structure acoustic feature extraction step of extracting the acoustic feature that is a value of a harmonic structure represented by a number, using a product of the correlation value calculated in said correlation value calculating step and the weight calculated in said weight calculation step, and wherein in said segment determination step, the speech segment is determined based on at least one of a correlation value between acoustic features in the same frame and a correlation value between acoustic features in different frames.

15. A harmonic structure acoustic signal detection method for detecting a segment that includes speech, as a speech segment, from an input acoustic signal which is divided into a plurality of frames with a predetermined period, said harmonic structure acoustic signal detection method comprising:

an acoustic feature extraction step of extracting an acoustic feature using a processor in each frame of the plurality of frames into which the input acoustic signal is divided; and a segment determination step of evaluating a continuity of the extracted acoustic features and of determining a speech segment according to the evaluated continuity, wherein said acoustic feature extraction step includes:

a frequency transformation step of frequency-transforming each frame of the plurality of frames to obtain components;

a correlation value calculation step of dividing the components obtained through said frequency transformation step into frequency bands of a predetermined bandwidth and calculating a correlation value between components in predetermined frequency bands in the same frame;

a weight calculation step of calculating a weight, in a same frame or between adjacent frames, the calculated weight, when a difference between a maximum value of the correlation values and a minimum value of the correlation values is larger than a threshold value, being smaller than the calculated weight when the difference between the maximum value of the correlation values and the minimum value of the correlation values is smaller than the threshold;

a correlation value calculation step of dividing the components obtained through said frequency transformation step into frequency bands of a predetermined bandwidth, and of calculating a correlation value between the components in predetermined frequency bands in the same frame; and an extraction step of extracting, as the acoustic feature, an identifier of a frequency band in which the component has a maximum value or a minimum value of the correlation values in the same frame, wherein said segment determination step includes:

an evaluation step of calculating an evaluation value for evaluating the continuity of the acoustic features; and a non-speech harmonic structure segment determination step of evaluating temporal continuity of the evaluation values and determining, according to the evaluated temporal continuity, a non-speech harmonic structure segment that has a harmonic structure but is not a speech segment, and wherein, in said segment determination step, the speech segment is determined based on at least one of a correlation value between acoustic features in the same frame and a correlation value between acoustic features in different frames.

16. A harmonic structure acoustic signal detection method for detecting a segment that includes speech, as a speech segment, from an input acoustic signal which is divided into a plurality of frames with a predetermined period, said harmonic structure acoustic signal detection method comprising:

an acoustic feature extraction step of extracting an acoustic feature using a processor in each frame of the plurality of frames into which the input acoustic signal is divided; and a segment determination step of evaluating a continuity of the extracted acoustic features and of determining a speech segment according to the evaluated continuity, wherein said acoustic feature extraction step includes:

a frequency transformation step of frequency-transforming each frame of the plurality of frames to obtain components;

a correlation value calculation step of dividing the components obtained through said frequency transformation step into frequency bands of a predetermined bandwidth and calculating a correlation value between components in predetermined frequency bands in frames which are a predetermined number of frames away from each other;

a weight calculation step of calculating a weight, in a same frame or between adjacent frames, the calculated weight, when a difference between a maximum value of the correlation values and a minimum value of the correlation values is larger than a threshold value, being smaller than the calculated weight when the difference between the maximum value of the correlation values and the minimum value of the correlation values is smaller than the threshold; and an acoustic feature extraction step of extracting the acoustic feature that is a value of a harmonic structure represented by a number, by calculating a distribution of the correlation values in every predetermined number of frames, and wherein, in said segment determination step, the speech segment is determined based on at least one of a correlation value between acoustic features in the same frame and a correlation value between acoustic features in different frames.

* * * * *